(12) United States Patent
Vitt et al.

(10) Patent No.: US 11,692,448 B1
(45) Date of Patent: Jul. 4, 2023

(54) PASSIVE VALVE ASSEMBLY FOR A NOZZLE OF A GAS TURBINE ENGINE

(71) Applicant: General Electric Company, Schenectady, NY (US)

(72) Inventors: Paul Hadley Vitt, Liberty Township, OH (US); Steven Douglas Johnson, Milford, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/686,871

(22) Filed: Mar. 4, 2022

(51) Int. Cl.
*F01D 9/04* (2006.01)
*F02C 3/00* (2006.01)
*F02C 7/18* (2006.01)
*F01D 11/18* (2006.01)
*F01D 5/18* (2006.01)
*F01D 9/06* (2006.01)

(52) U.S. Cl.
CPC .............. *F01D 9/04* (2013.01); *F01D 5/18* (2013.01); *F01D 9/06* (2013.01); *F01D 11/18* (2013.01); *F02C 3/00* (2013.01); *F02C 7/18* (2013.01); *Y10T 137/7737* (2015.04)

(58) Field of Classification Search
CPC .................................. F01D 11/16; F01D 11/18
USPC ........................................................ 416/96 R
See application file for complete search history.

(56) References Cited

U.S. PATENT DOCUMENTS

| | | | |
|---|---|---|---|
| 2,582,842 A | 1/1952 | Messinger | |
| 2,787,440 A * | 4/1957 | Thompson, Jr. | .......... F01D 5/18 |
| | | | 415/12 |
| 3,220,697 A * | 11/1965 | Robert | ..................... F01D 5/187 |
| | | | 416/96 R |
| 3,420,502 A * | 1/1969 | Howald | ................... F01D 5/187 |
| | | | 415/115 |
| 3,584,458 A * | 6/1971 | Wetzler | ................. F01D 17/162 |
| | | | 60/785 |
| 3,736,069 A * | 5/1973 | Beam, Jr. | ................ F01D 9/041 |
| | | | 415/115 |
| 3,814,313 A | 6/1974 | Beam, Jr. et al. | |
| 3,895,243 A | 7/1975 | Amend et al. | |
| 4,023,731 A | 5/1977 | Patterson | |
| 4,296,599 A * | 10/1981 | Adamson | .................. F02C 7/18 |
| | | | 415/116 |
| 4,505,124 A | 3/1985 | Mayer | |
| 4,550,573 A | 11/1985 | Rannenberg | |
| 4,613,280 A | 9/1986 | Tate | |

(Continued)

FOREIGN PATENT DOCUMENTS

| | | |
|---|---|---|
| DE | 961742 C | 4/1957 |
| EP | 2003311 A2 | 12/2008 |

(Continued)

*Primary Examiner* — Todd E Manahan
*Assistant Examiner* — Marc J Amar
(74) *Attorney, Agent, or Firm* — Dority & Manning, P.A.

(57) ABSTRACT

A nozzle assembly for a gas turbine engine includes a nozzle having a first material defining a first coefficient of thermal expansion, the nozzle having an airfoil defining a fluid passage therein, an inlet wall defining a fluid inlet that is fluidly connected to the fluid passage, and a passive valve assembly comprising an annular band, the annular band comprising a second material having a second coefficient of thermal expansion less than the first coefficient of thermal expansion such that the passive valve assembly is at least partially moveable relative to the fluid inlet.

20 Claims, 18 Drawing Sheets

(56) References Cited

U.S. PATENT DOCUMENTS

| | | | |
|---|---|---|---|
| 4,730,982 A | 3/1988 | Kervistin | |
| 4,773,212 A | 9/1988 | Griffin et al. | |
| 4,805,398 A | 2/1989 | Jourdain et al. | |
| 5,149,018 A | 9/1992 | Clark | |
| 5,245,821 A | 9/1993 | Thomas, Jr. et al. | |
| 5,316,437 A * | 5/1994 | Czachor | F01D 9/065 |
| | | | 415/115 |
| 5,341,636 A | 8/1994 | Paul | |
| 5,667,168 A | 9/1997 | Fluegel | |
| 5,722,241 A | 3/1998 | Huber | |
| 5,724,806 A | 3/1998 | Homer | |
| 5,931,636 A | 8/1999 | Savage et al. | |
| 5,941,537 A | 8/1999 | Wallace et al. | |
| 6,050,079 A | 4/2000 | Durgin et al. | |
| 6,106,229 A | 8/2000 | Nikkanen et al. | |
| 6,116,852 A | 9/2000 | Pierre et al. | |
| 6,126,390 A * | 10/2000 | Bock | F01D 11/24 |
| | | | 415/176 |
| 6,182,435 B1 | 2/2001 | Niggemann et al. | |
| 6,250,097 B1 | 6/2001 | Lui et al. | |
| 6,415,595 B1 | 7/2002 | Wilmot, Jr. et al. | |
| 6,435,454 B1 | 8/2002 | Engelhardt | |
| 6,485,255 B1 | 11/2002 | Care et al. | |
| 6,672,072 B1 | 1/2004 | Giffin, III | |
| 6,701,717 B2 | 3/2004 | Flatman et al. | |
| 7,118,322 B2 | 10/2006 | Mortgat | |
| 7,260,926 B2 | 8/2007 | Sabatino et al. | |
| 7,377,098 B2 | 5/2008 | Walker et al. | |
| 7,395,657 B2 | 7/2008 | Johnson | |
| 7,398,641 B2 | 7/2008 | Stretton et al. | |
| 7,445,424 B1 * | 11/2008 | Ebert | F01D 5/081 |
| | | | 415/113 |
| 7,836,680 B2 | 11/2010 | Schwarz et al. | |
| 7,882,704 B2 | 2/2011 | Chen | |
| 7,966,807 B2 | 6/2011 | Norris et al. | |
| 7,987,676 B2 | 8/2011 | Ast et al. | |
| 8,043,045 B2 | 10/2011 | Clark et al. | |
| 8,177,884 B2 | 5/2012 | Schmidt et al. | |
| 8,261,528 B2 | 9/2012 | Chillar et al. | |
| 8,499,822 B2 | 8/2013 | Bulin et al. | |
| 8,522,572 B2 | 9/2013 | Coffinberry et al. | |
| 8,561,386 B2 | 10/2013 | Mons | |
| 8,678,753 B2 | 3/2014 | Farrell | |
| 8,684,275 B2 | 4/2014 | Vafai et al. | |
| 8,747,055 B2 | 6/2014 | McCune et al. | |
| 8,757,508 B2 | 6/2014 | Haasz et al. | |
| 8,765,070 B2 | 7/2014 | Norton et al. | |
| 8,789,377 B1 | 7/2014 | Brostmeyer | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 8,991,191 B2 | 3/2015 | Diaz et al. | |
| 9,014,791 B2 | 4/2015 | Held | |
| 9,038,397 B2 | 5/2015 | Papa et al. | |
| 9,120,580 B2 | 9/2015 | Sampath | |
| 9,127,566 B2 | 9/2015 | Suciu et al. | |
| 9,175,566 B2 | 11/2015 | Xu et al. | |
| 9,181,933 B2 | 11/2015 | Daly et al. | |
| 9,188,010 B2 | 11/2015 | Jha et al. | |
| 9,200,855 B2 | 12/2015 | Kington et al. | |
| 9,267,382 B2 | 2/2016 | Szwedowicz et al. | |
| 9,297,310 B2 | 3/2016 | Giri et al. | |
| 9,347,334 B2 | 5/2016 | Joe et al. | |
| 9,410,482 B2 | 8/2016 | Krautheim et al. | |
| 9,458,764 B2 | 10/2016 | Alecu et al. | |
| 9,567,095 B2 | 2/2017 | McCarthy et al. | |
| 9,580,185 B2 | 2/2017 | Rhoden et al. | |
| 9,593,590 B2 | 3/2017 | Ebert et al. | |
| 9,644,490 B2 | 5/2017 | Joe et al. | |
| 10,113,486 B2 | 10/2018 | Mueller et al. | |
| 10,619,504 B2 | 4/2020 | Tyler et al. | |
| 10,760,426 B2 | 9/2020 | Vitt et al. | |
| 10,787,920 B2 | 9/2020 | Day et al. | |
| 10,920,612 B2 | 2/2021 | Lefebvre et al. | |
| 2009/0016871 A1 | 1/2009 | McCaffrey | |
| 2009/0133380 A1 | 5/2009 | Donnerhack | |
| 2009/0188234 A1 | 7/2009 | Suciu et al. | |
| 2009/0196737 A1 * | 8/2009 | Mitchell | F01D 5/186 |
| | | | 415/115 |
| 2010/0212857 A1 | 8/2010 | Bulin et al. | |
| 2010/0288376 A1 * | 11/2010 | Haasz | F16K 31/002 |
| | | | 137/468 |
| 2010/0313591 A1 | 12/2010 | Lents et al. | |
| 2012/0216502 A1 | 8/2012 | Freund et al. | |
| 2013/0186100 A1 | 7/2013 | Rhoden et al. | |
| 2013/0192238 A1 | 8/2013 | Munsell et al. | |
| 2013/0259687 A1 | 10/2013 | Suciu et al. | |
| 2013/0280028 A1 | 10/2013 | Benjamin et al. | |
| 2014/0165570 A1 | 6/2014 | Herring | |
| 2014/0205446 A1 | 7/2014 | Patsouris et al. | |
| 2014/0271115 A1 * | 9/2014 | Duge | F01D 9/065 |
| | | | 415/17 |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0114611 A1 | 4/2015 | Morris et al. | |
| 2016/0108814 A1 | 4/2016 | Schmitz | |
| 2016/0138478 A1 | 5/2016 | Negulescu | |
| 2016/0215646 A1 | 7/2016 | Gonyou et al. | |
| 2016/0290214 A1 | 10/2016 | Ekanayake et al. | |
| 2016/0341126 A1 | 11/2016 | Kupratis et al. | |
| 2016/0369700 A1 | 12/2016 | Ribarov et al. | |
| 2017/0030266 A1 | 2/2017 | Cerny et al. | |
| 2017/0044984 A1 | 2/2017 | Pesyna et al. | |
| 2017/0114721 A1 | 4/2017 | Miller et al. | |
| 2017/0159566 A1 | 6/2017 | Sennoun et al. | |
| 2017/0167382 A1 | 6/2017 | Miller et al. | |
| 2017/0184027 A1 | 6/2017 | Moniz et al. | |
| 2018/0354637 A1 | 12/2018 | Suciu et al. | |
| 2019/0063313 A1 | 2/2019 | Rez et al. | |
| 2019/0153952 A1 | 5/2019 | Niergarth et al. | |
| 2019/0153953 A1 | 5/2019 | Niergarth et al. | |
| 2019/0186296 A1 * | 6/2019 | Orkiszewski | F01D 25/164 |
| 2019/0218971 A1 | 7/2019 | Niergarth et al. | |
| 2020/0199051 A1 | 6/2020 | Ohhigashi et al. | |
| 2021/0199051 A1 | 7/2021 | Gonyou et al. | |

FOREIGN PATENT DOCUMENTS

| | | |
|---|---|---|
| EP | 2388436 A2 | 11/2011 |
| EP | 3018304 A1 | 5/2016 |
| EP | 3075957 A1 | 10/2016 |
| EP | 3130763 A1 | 2/2017 |
| EP | 3784958 A1 | 3/2021 |
| GB | 2034822 A | 6/1980 |
| GB | 2136880 A | 9/1984 |
| GB | 2204361 A | 11/1988 |
| JP | S5932893 U | 2/1984 |
| WO | WO02/16743 A1 | 2/2002 |
| WO | WO02/038938 A1 | 5/2002 |
| WO | WO2006/079438 A1 | 8/2006 |
| WO | WO2011/038188 A1 | 3/2011 |
| WO | WO2015/105552 A1 | 7/2015 |

* cited by examiner

US 11,692,448 B1

PASSIVE VALVE ASSEMBLY FOR A NOZZLE OF A GAS TURBINE ENGINE

FIELD

The present subject matter relates generally to passive valve assembly for a nozzle of a gas turbine engine. More specifically, the subject matter relates to a passive valve assembly for a fluidic variable area turbine nozzle of gas turbine engines.

BACKGROUND

Gas turbine engines are rotary engines that extract energy from a flow of combusted gases passing through the engine to rotating turbine blades.

Gas turbine engines typically have a compressor section that compresses a volume of air entering the engine, a combustor section that combusts a mixture of the compressed air and fuel to generate combustion gasses through the engine, and a turbine section that is driven by the combustion gasses to drive the compressor section and generate thrust. A nozzle may be formed at a first stage of the turbine section downstream of the combustion section to direct the flow from the combustor to blades of the turbine section. The nozzle may include a throat of the engine, and engine performance may be limited by the nozzle. Thus, a configuration of the nozzle may be important in determining engine efficiency and thrust.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
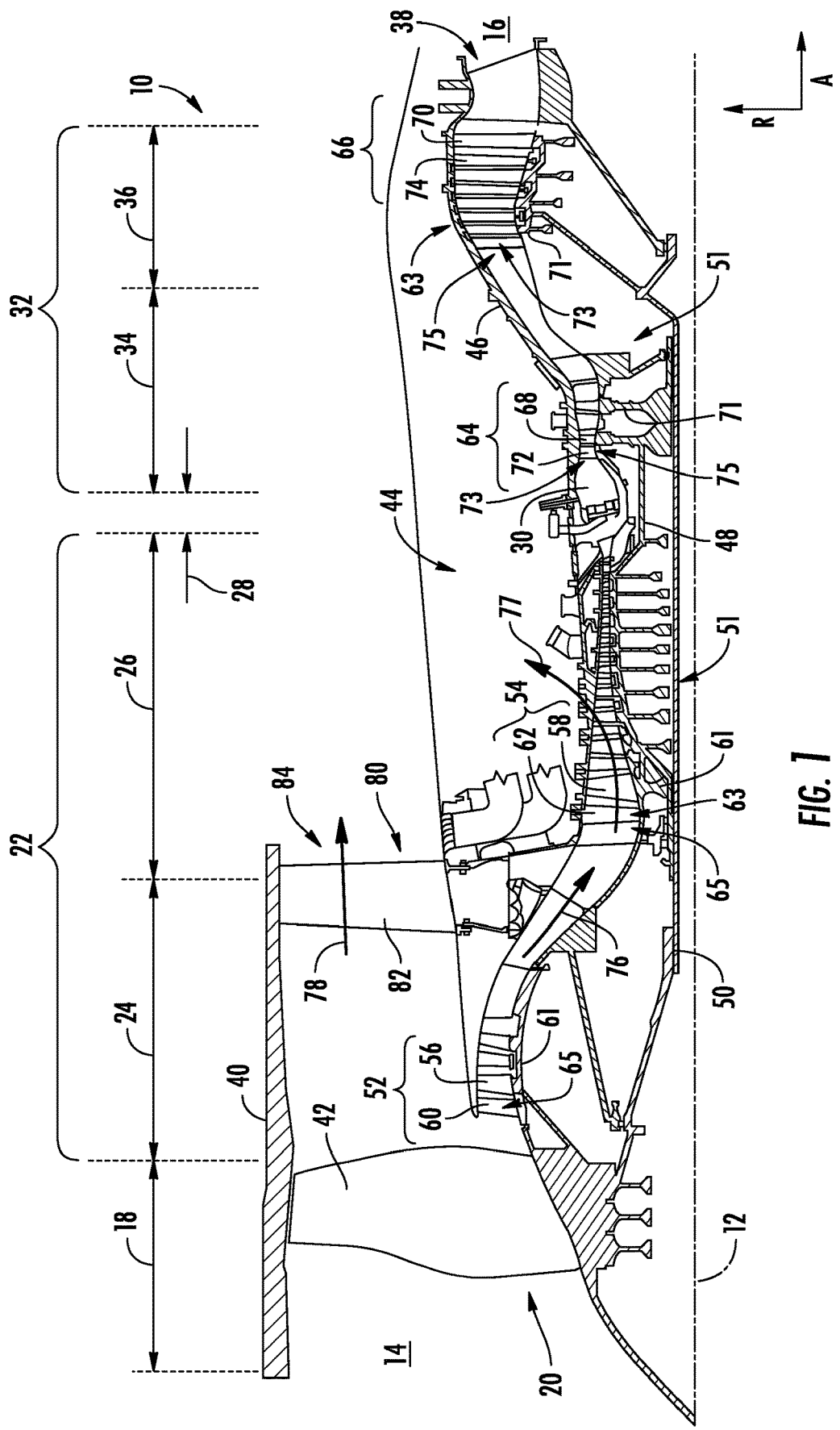
FIG. 1 is a schematic cross-sectional view of a gas turbine engine according to one or more embodiments.

Repeat use of reference characters in the present specification and drawings is intended to represent the same or analogous features or elements of the present disclosure.

DETAILED DESCRIPTION

Reference now will be made in detail to aspects of the disclosure, one or more examples of which are illustrated in the drawings. Each example is provided by way of explanation of the aspects of the disclosure and are not limiting. In fact, it will be apparent to those skilled in the art that various modifications and variations may be made to the disclosed embodiments without departing from the scope or spirit of the disclosure. For instance, features illustrated or described as part of one embodiment may be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," "formed on," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components, systems, or a combination thereof. For example, the approximating language may refer to being within a 1, 2, 4, 10, 15, or 20 percent margin. These approximating margins may apply to a single value, either or both endpoints defining numerical ranges, the margin for ranges between endpoints, or a combination thereof.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide (Al2O3), silicon dioxide (SiO2), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide (Al2O3), silicon dioxide (SiO2), aluminosilicates, and mixtures thereof. Aluminosilicates can include crystalline materials such as mullite (3Al2O3 2SiO2), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Fluidic variable area turbine nozzles may improve a performance of an engine by modifying a compressor operation line. Generally, having a higher compressor operation line in the engine at aircraft flight cruise conditions may increase efficiency. However, operability of the engine at high power conditions may require a comparatively more open throat. High power conditions may include takeoff conditions, steep climb conditions, and any other condition that may employ relatively high thrust. The throat may be set in view of the high power condition(s) which could result in lower efficiency during cruise conditions. However, fluidic variable area turbine nozzles may allow for improvement of efficiency during cruise conditions and operability at higher power conditions. While conventional variable area turbine nozzles mechanically alter the throat depending on operation conditions of the engine, the mechanical components required therefor, e.g., actuators, seals, etc., may result in increased weight and mechanical complexity. In contrast, fluidic variable area turbine nozzles may exhaust an airflow bled from a compressor section at a location downstream of the throat via exhaust holes, which effectively increases the volume of airflow flowing past an axial position of the throat without increasing the volume of airflow actually passing through the throat, permitting a greater flow capacity through the engine. That is, the throat may be sized for cruise condition efficiency, and during high power condition(s), airflow may be bled from the compressor section and exhausted downstream of the throat to increase the volume of airflow flowing past an axial position of the throat.

While external valves with associated plumbing and controllers may actively control airflow to the suction side passage to be exhausted downstream of the throat via exhaust holes, the components associated therewith may increase weight and cause both controller and supply plumbing issues. In contrast, passive valve assemblies described herein may passively allow airflow to be exhausted downstream of the throat when desired by structuring the passive valve assemblies and an outer band to open a cooling airflow inlet during high power condition(s). During cruise conditions, the cooling airflow inlet may be closed by the passive valve assemblies for optimized efficiency. The passive valve assemblies described herein may eliminate the requirement for active valves, controllers, or plumbing, resulting in less weight, cost, and complexity. It is noted that the structures disclosed herein may be applicable to ground-based gas turbine engines such as for ground-based gas turbine power plants as well. While cruise and high power operations of aircraft engines are referenced herein, in ground-based gas turbine engines, the cruise operation can correspond to a part-speed/part-load operation, and the high power operation can correspond go high-speed/high-load operation.

Referring to FIG. 1, an engine 10 has a generally longitudinally extending axis or centerline 12 extending in an axial direction A of the engine 10 from forward 14 to aft 16. The engine 10 also defines a radial direction R perpendicular to the centerline 12, and a circumferential direction C extending around the centerline 12. The engine 10 may include, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34 and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10 that generates combustion gases. The core 44 is surrounded by core casing 46 which may be coupled with the fan casing 40. The core casing 46 may be formed of metal.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and the fan 20. According to one or more embodiments, the HP and LP spools 48, 50 may have fixed shaft and geared connections. The HP and LP spools 48, 50 are rotatable about the engine centerline 12 and couple to a plurality of rotatable elements, which may collectively define a rotor 51.

The LP compressor 24 and the HP compressor 26 respectively include a plurality of compressor stages 52, 54 in which a set of compressor blades 56, 58 rotate relative to a corresponding set of static compressor vanes 60, 62, also called a nozzle 73, to compress or pressurize the stream of fluid passing through the stage. A nozzle assembly 65 for the compressor section 22 may be formed as an annular set of nozzles or compressor vanes 60, 62, having a set or plurality of segments forming the annular nozzle assembly 65. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned upstream of and adjacent to the rotating blades 56, 58. The numbers of blades, vanes, and compressor stages shown in FIG. 1 are for illustrative purposes only, and are not intended to be limiting in any way. The engine 10 may include other numbers of blades, vanes, and compressor stages.

The blades 56, 58 for a stage of the compressor may be mounted to a disk 61, which is mounted to the corresponding one of the HP and LP spools 48, 50, with each stage having its own disk 61. The vanes 60, 62 for a stage of the compressor may be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also called a nozzle 73, to extract energy from the stream of fluid passing through the stage. A turbine nozzle assembly 75 for the turbine section 32 may be formed as an annular set of nozzles or turbine vanes 72, 74, having a set or plurality of segments forming the annular nozzle assembly 75. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. The numbers of blades, vanes, and turbine stages shown in FIG. 1 are for illustrative purposes only, and are not intended to be limiting in any way. The engine 10 may include other numbers of numbers of blades, vanes, and turbine stages.

The blades 68, 70 for a stage of the turbine may be mounted to a disk 71, which is mounted to the corresponding one of the HP and LP spools 48, 50, with each stage having a dedicated disk 71. The vanes 72, 74 for a stage of the compressor may be mounted to the core casing 46 in a circumferential arrangement.

Complementary to the rotor portion, the stationary portions of the engine 10, such as the static vanes 60, 62, 72, 74 among the compressor and turbine section 22, 32, may be referred to individually or collectively as a stator 63. As such, the stator 63 may refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26 that further pressurizes the air. The pressurized air 76 from the HP compressor 26 is mixed with fuel in the combustor 30 and ignited, thereby generating combustion gases. Some work is extracted from these gases by the HP turbine 34 which drives the HP compressor 26. The combustion gases are discharged into the LP turbine 36 which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 may be drawn from the compressor section 22 as bleed air 77. The bleed air 77 may be drawn from the pressurized airflow 76 and provided to engine components requiring cooling. The temperature of pressurized airflow 76 being exhausted from the combustor 30 is significantly increased. As such, cooling provided by the bleed air 77 may be beneficial for operating of such engine components in the heightened temperature environments.

A remaining portion of the airflow 78 bypasses the LP compressor 24 and engine core 44 and exits the engine 10 through a stationary vane row, and more particularly an outlet guide vane assembly 80 comprising a plurality of airfoil guide vanes 82 at the fan exhaust side 84. More specifically, a circumferential row of radially extending airfoil guide vanes 82 are utilized adjacent the fan section 18 to exert some directional control of the airflow 78.

Some of the air supplied by the fan 20 may bypass the engine core 44 and be used for cooling of portions, e.g., hot portions, of the engine 10, or used to cool or power other aspects of the aircraft, or a combination thereof. In the context of a turbine engine, the hot portions of the engine are normally downstream of the combustor 30, e.g., the turbine section 32, with the HP turbine 34 usually being the hottest portion as it is directly downstream of the combustion section 28. Other sources of cooling fluid may be, but are not limited to, fluid discharged from the LP compressor 24 or the HP compressor 26.

Figure 2:
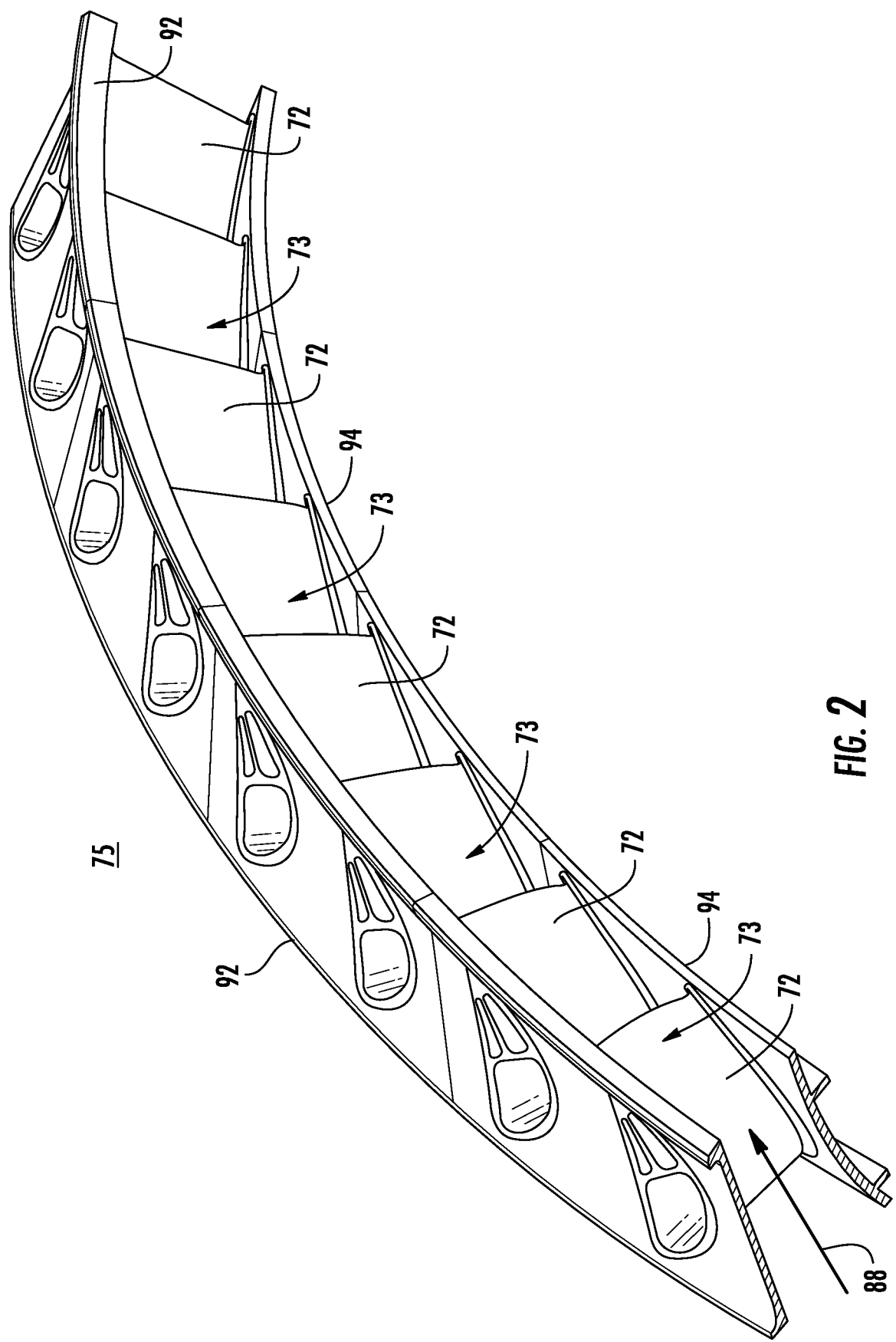
FIG. 2 is a perspective view of a portion of a nozzle assembly according to one or more embodiments.

Referring to FIG. 2, a portion of the nozzle assembly 75 includes a set of nozzles 73 in circumferential arrangement. The circumferential arrangement of nozzles 73 defines an annular structure for the nozzle assembly 75 which may be positioned around the engine centerline 12 of FIG. 1. For example, the nozzle assembly 75 may be positioned within the first stage of the HP turbine 34 of FIG. 1, immediately downstream of the combustion section 28. The nozzle assembly 75 may be positioned anywhere along the turbine section or compressor section of a turbine engine. Alternatively, the nozzle assembly 75 may be positioned in the secondary cooling supply system, such as in an inducer, accelerator, or turbine on-boarding inducer. Each nozzle 73 includes an outer band 92 and an inner band 94, with two static vanes 72 extending between the outer and inner bands 92, 94. For example, the nozzles 73 may be uncooled nozzles that do not have internal cooling from an exterior source, or subsonic nozzles adapted to operate under flow speeds less than the speed of sound. While only four nozzles 73 are illustrated, a plurality of nozzles 73 may be arranged to form the annular nozzle assembly 75. A flow path 88 may be defined for an airflow passing through the nozzle assembly 75, between the upper and lower bands 92, 94 and through the vanes 72. The annular geometry of the nozzle assembly 75 may define an annular cross-sectional area for the flow path 88.

Figure 3:
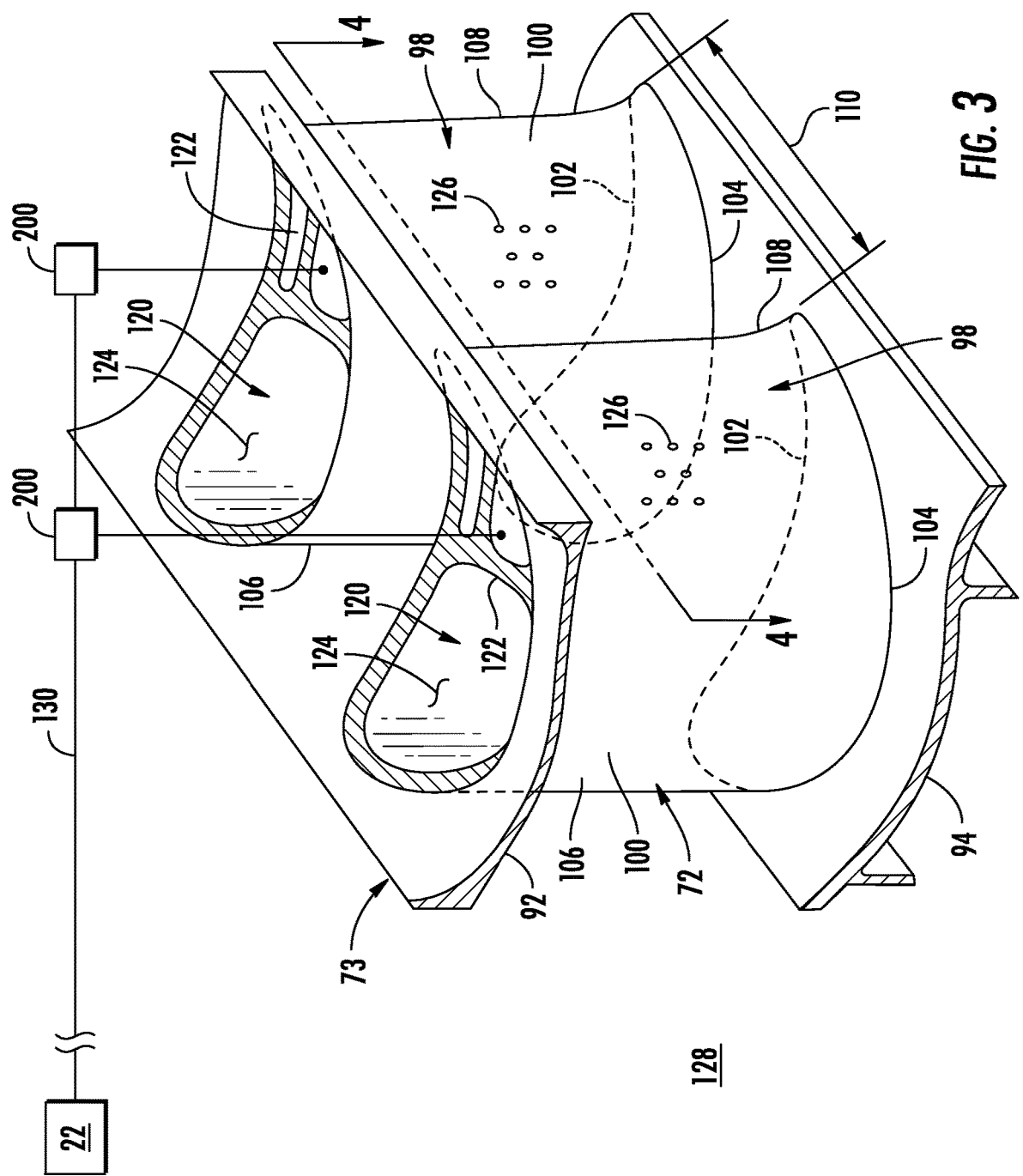
FIG. 3 is a perspective view of one nozzle section of the nozzle assembly schematically coupled to a compressor section through a passive valve assembly according to one or more embodiments.

Referring to FIG. 3, one exemplary turbine nozzle 73 is shown including two vanes 72 that may be airfoils 98 having an outer wall 100 defining a pressure side 102 and a suction side 104, extending between a leading edge 106 and a trailing edge 108. While illustrated as two vanes 72 or airfoils 98 per nozzle 73 as a doublet arrangement, it should be appreciated that any number of airfoils 98 may be provided in the nozzle, such as one or more. Furthermore, while described in relation to static vanes 72 as the airfoils 98, embodiments may have equal applicability to rotating blades, such as the blades 68, 70 of FIG. 1. The airfoils 98 are spaced from one another by a spacing gap 110. While the spacing gap 110 is illustrated between the trailing edges 108 of the airfoils 98, the spacing between airfoils 98 may vary based upon the variable thickness of the airfoils 98. The nozzles 73 are sized such that airfoils 98 on adjacent nozzles 73 are spaced from one another by the spacing gap 110, such that all airfoils 98 in an annular nozzle assembly are equally spaced from one another. In an alternative example, the nozzle assembly may be unequally spaced, such that the spacing gap would be variable along the nozzle assembly.

An interior 120 for the airfoils 98 is defined by the outer wall 100. One or more interior structures, for example ribs 122, may separate the interior 120 into interior passages 124. In one additional, non-limiting example, the interior structure may be an insert for the nozzle 73. While three interior passages 124 are illustrated at each airfoil 98, any number, combination or geometry for the interior passages 124 may be defined within the airfoil 98 for the particular airfoil 98 or nozzle 73. Furthermore, all airfoils 98 arranged in the nozzle 73 or the nozzle assembly 75 may be identical, while nozzles 73 among different engine stages or axial positions may vary. A set of exhaust holes 126 may be provided in the outer wall 100. The exhaust holes 126 may fluidly couple the interior 120 to an exterior 128 of each of the airfoils 98. In one non-limiting example, the exhaust holes 126 may be film holes providing a film along the exterior surface of the airfoil 98. It should be appreciated that the exhaust holes 126 need not be film holes and may be any suitable aperture provided in the outer wall 100.

A fluid supply line 130 may fluidly couple the compressor section 22 to at least one interior 120 of the airfoils 98. In one non-limiting example, the fluid supply line 130 may supply a flow of bleed air to the airfoils 98, while other fluids or fluid supplies are contemplated. While illustrated schematically, the fluid supply line 130 may be a hollow conduit, permitting the passage of a fluid through the interior of the conduit. Similarly, the conduit may be fluidly coupled to the interior 120 of the airfoils 98 for providing such a flow of fluid to the interior 120 of the airfoils 98. The fluid supply line 130 may couple to one interior passage 124 positioned adjacent the suction side 104, where the exhaust holes 126 may fluidly couple the fluid supply line 130 to the exterior 128 of the airfoils 98. In such an example, the interior passage 124 may be fluidly sealed from the rest of the interior 120 of the nozzle 73 and the exterior 128 of the nozzle 73, except through the exhaust holes 126.

According to one or more embodiments, a plurality of passive valve assemblies 200 may be disposed along the fluid supply line 130. According to one or more embodiments, each airfoil 98 may have a corresponding passive valve assembly 200. The passive valve assembly 200, shown schematically in FIGS. 3-6, will be described in more detail with respect to FIGS. 7-19C. While FIGS. 3-6 show the passive valve assembly 200 separately from the nozzle 73, according to one or more embodiments, the passive valve assembly 200 is formed on the nozzle 73. Furthermore, as shown in FIGS. 7-18, the nozzle 73 may further include a radially extending portion 250 with a cooling airflow inlet 251 in addition to the structure shown in FIGS. 3-6. The passive valve assembly 200 may selectively provide a flow of fluid to the nozzle 73 through the fluid supply line 130. For example, in an open position, the passive valve assembly 200 may permit the flow of fluid to pass from the compressor section 22 to the nozzle 73, while in a closed position, the passive valve assembly 200 may partially or entirely prevent the flow of fluid to the nozzle 73. Furthermore, the passive valve assembly 200 may move to positions between the open position and the closed position such that the flow of fluid to the nozzle 73 may be varied. According to one or more embodiments, the passive valve assembly 200 may vary a flow area of the cooling airflow inlet 251.

Figure 4:
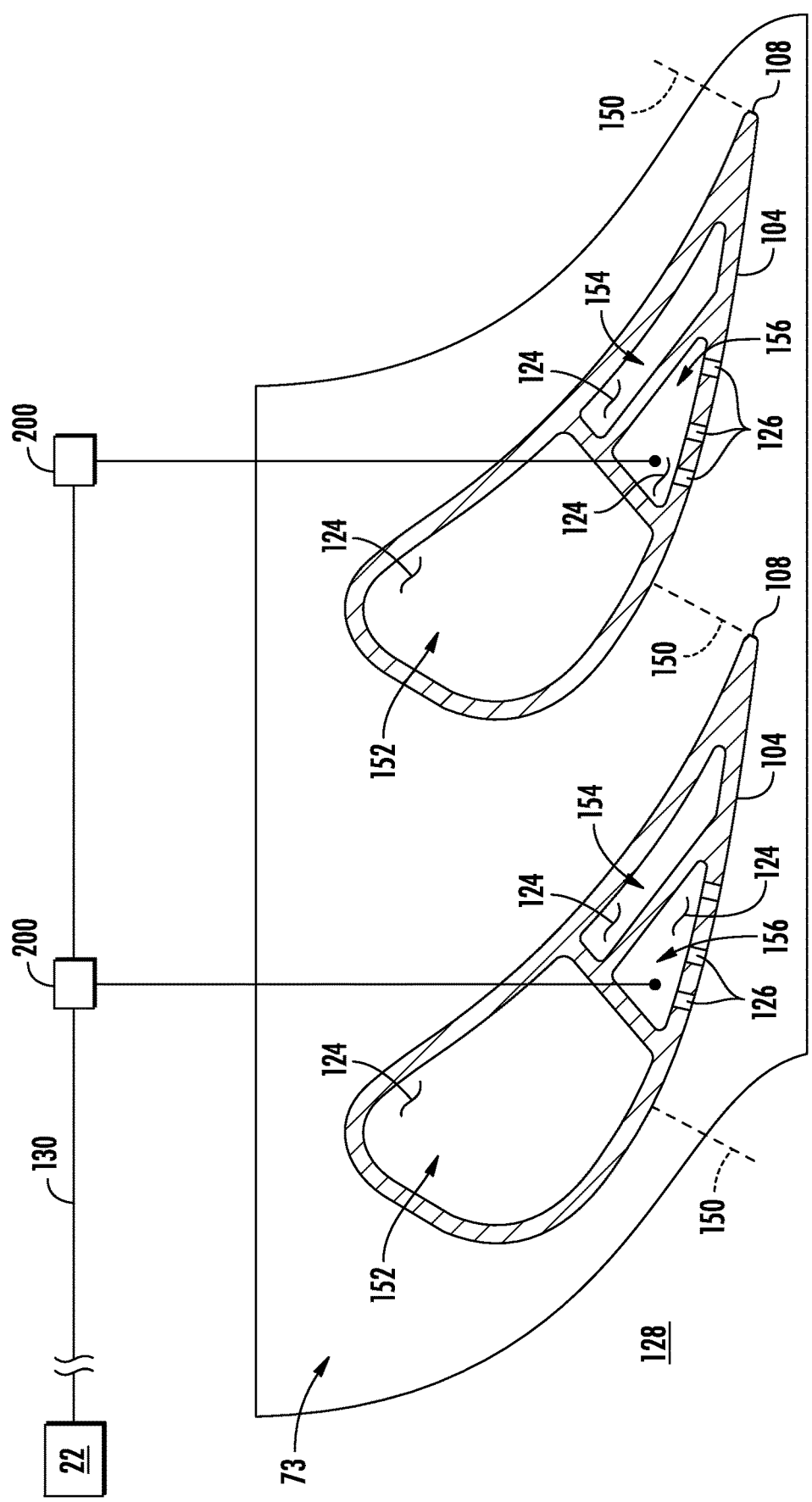
FIG. 4 is a cross-sectional view of the nozzle section of FIG. 3 taken along 4-4, illustrating a throat according to one or more embodiments.

Referring now to FIG. 4, a throat 150 may be defined between the airfoils 98 as the shortest distance between the airfoils 98. Commonly, the throat 150 is defined between the suction side 104 of one airfoil 98 and the trailing edge 108 of the adjacent airfoil 98, as is illustrated. However, the present disclosure is not so limited, and the throat 150 may be defined at any position between the airfoils 98 that is the shortest distance between the airfoils 98. The interior passages 124 may be defined as a leading edge passage 152, a trailing edge passage 154, and a suction side passage 156. The exhaust holes 126 may be provided in the suction side 104 fluidly coupling the suction side passage 156 to the exterior 128 of the nozzle 73. According to one or more embodiments, the exhaust holes 126 may be positioned downstream of the throat 150. According to one or more embodiments, the exhaust holes 126 may be positioned upstream of the trailing edge 108. According to one or more embodiments, the exhaust holes 126 may be positioned centrally between the throat 150 and the trailing edge 108, equidistant from the two. According to one or more embodiments, the exhaust holes 126 may be positioned centrally between the root and the tip of the airfoil 98. The suction side passages 156 may be fluidly isolated from the remainder of the passages 152, 154 and the rest of the interior 120 of the nozzle 73. The fluid supply line 130 may fluidly couple to the suction side passages 156 to exhaust a fluid through the exhaust holes 126, downstream of the throat 150. As such, the fluid supply line 130, the passive valve assembly 200, and any interconnected components connected to the suction side passages 156 may be fluidly isolated from the remainder of the nozzle 73.

Figure 5:
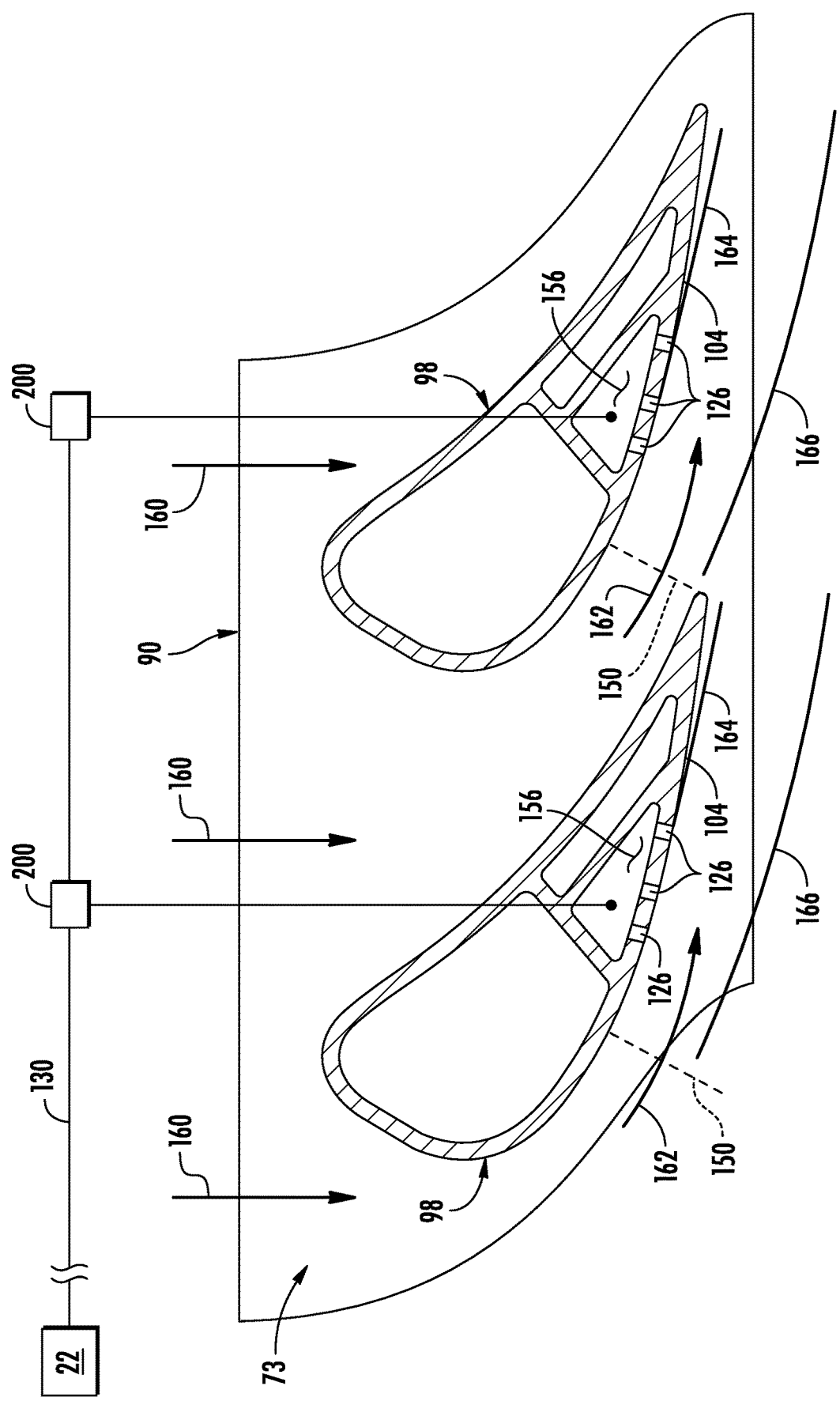
FIG. 5 is a cross-sectional view of the nozzle section of FIG. 3 taken along 4-4, illustrating flow passing through the throat according to one or more embodiments.

Referring now to FIG. 5, during operation of an engine containing the nozzle 73, a mainstream flow 160 from the combustor 30 (see FIG. 1) may be provided to the nozzle 73. The mainstream flow 160 may travel in substantially the axial direction A through the engine and the nozzle 73. In one non-limiting example, the mainstream flow 160 may have a helical component, wherein the mainstream flow 160 is circumferentially rotating about an engine center and travelling in an axial direction A. A streamline flow 162 may be defined through the nozzle 73 between the airfoils 98, turning the mainstream flow 160 as it passes through the nozzle 73. A boundary layer 164 may form along the suction side 104 of the airfoils 98 and a streamline edge 166 may be spaced from the boundary layer 164 representative of the streamline flow 162 being exhausted from the throat 150. The boundary layer 164 may be present along the suction side 104 and may provide a small amount of blockage at the throat 150, forming an effective throat that is slightly narrower than the physical throat 150. The effective throat limits flow capacity through the engine, and therefore limits the power and thrust generated by the engine. The size of the throat 150 is set by balancing operability, such as staying with proper stall margins, with efficiency, which may increase by narrowing the throat 150. As such, the narrowed throat resulting from the boundary layer may negatively impact engine operation. Conditions such as stall margins and flow disturbances or flow attachment through the nozzle 73 may limit the size of the throat 150. It may be beneficial for the nozzle 73 to not permit too small of a flow volume or too great of a flow volume to prevent the engine stall or inefficiency. As such, the throat is sized based upon these limitations to remain within stall margins while maximizing efficiency. However, different operational conditions may have different requirements for the engine. Such single throat geometry may not be tailored to the differing needs of the varying operational conditions the engine requires during operation.

As shown in FIG. 5, when the passive valve assembly 200 is closed, the amount of fluid from the fluid supply line 130 to the suction side passage 156 is restricted. Therefore, only a small or zero amount of flow exits through the exhaust holes 126 and the effective throat is sized solely or mostly upon the actual physical geometry of the nozzle 73 and the boundary layer 164 along the suction side 104. In this condition, the flow passing through the nozzle 73 may be set by a relationship between the inlet pressure of the mainstream flow 160, the pressure and diluted temperature at the throat 150, the size of the effective throat narrowed by the boundary layer 164, or a combination thereof. The pressure at the throat 150 is determined by the geometry of the nozzle 73 and the pressure of the streamline flow 162 downstream of the throat 150, which is determined by the remainder of the engine downstream of the nozzle 73. The relationship between the pressure at the throat 150 and the pressure of the streamline flow 162 downstream of the throat 150 is known as pressure recovery, with the flow diffusing and resulting in increasing pressure downstream of the throat 150 and the nozzle 73.

In a case of rotating blades, or other similar elements such as an inducer or accelerator, a throat may be defined between adjacent blades or similar elements defining a throat. In such a case, an interior passage may be fluidly coupled to the passive valve assembly 200 to modulate a flow of fluid to the blades or similar elements.

Figure 6:
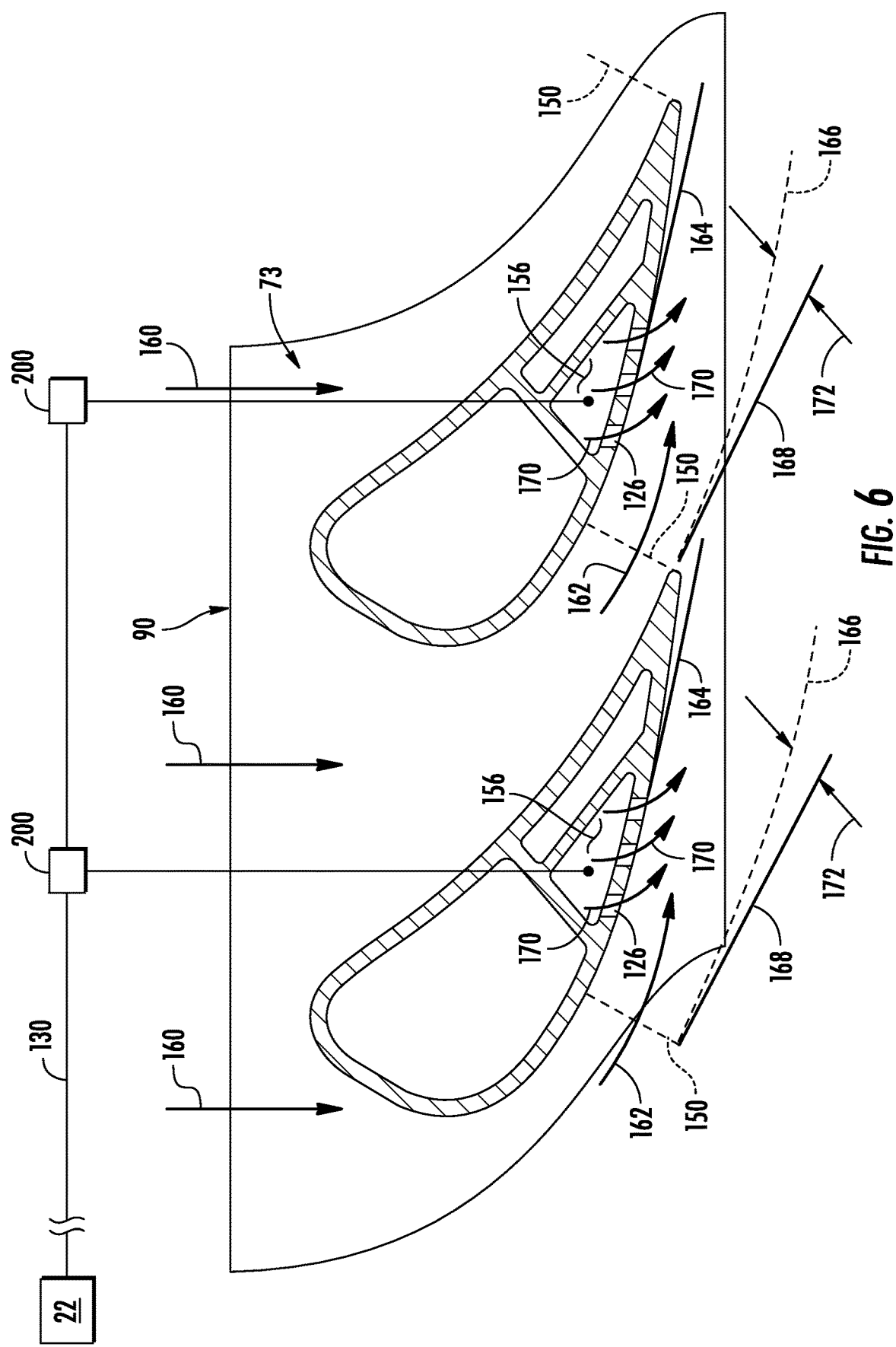
FIG. 6 is a cross-sectional view of the nozzle section of FIG. 3 taken along 4-4, illustrating cooling flow that is exhausted downstream of the throat according to one or more embodiments.

As shown in FIG. 6, when the passive valve assembly 200 is in an at least partially open position, a flow of fluid is provided along the fluid supply line 130 to the suction side passage 156 where a flow of fluid 170 may exit from the suction side passage 156 through the exhaust holes 126 downstream of the throat 150. The flow of fluid 170 exiting from the exhaust holes 126 alters the course of the streamline edge 166 to a widened streamline edge 168, such that the streamline flow 162 widens at 172 in FIG. 6 as compared to the streamline flow 162 of FIG. 5 without the flow of fluid 170 exhausted from the exhaust holes 126.

As the streamline flow 162 expands to the widened streamline edge 168, the effective geometry of the diffused streamline flow 162 is changed and widened. Widening of the streamline flow 162 increases the rate of diffusion that occurs downstream of the throat 150. Since the pressure downstream of the throat 150 is controlled by the engine components downstream of the nozzle 73, the increased diffusion results in a decreased pressure at the effective throat 150. Flow through the throat 150 is governed by the pressure of the mainstream flow 160 entering the nozzle 73, the pressure and diluted temperature at the throat 150, and the effective throat defined by the boundary layer 164. As such, increasing the recovery downstream of the throat 150 by adding mass via the flow of fluid 170 from the exhaust holes 126 may lower the pressure at the throat 150 and may increase the mass flow capacity of the throat 150, resulting in an effective variable throat. The effective variable throat may be controlled proportional to the flow of fluid 170. In addition to the fluidic effect of increasing the pressure recovery, the flow capacity of the nozzle 73 is also changed by the exhaust holes 126 exiting downstream of the throat 150, as the exhaust holes 126 provides another path for air from the compressor section 22 to flow through the engine 10. Thus, the effective flow provided downstream of the throat 150 when the passive valve assembly 200 is open is a sum of flow passing through the throat 150 which is increased due to increased pressure recovery enabling more flow through the throat 150, and the flow through the exhaust holes 126 bypassing the throat 150.

The variability of the throat 150 may be controlled by the structure of the passive valve assembly 200. In one non-limiting example, the variability of the throat 150 may be proportionally controlled by the structure of the passive valve assembly 200. For example, the passive valve assembly 200 may be structured to be opened, to be partially opened, or to open when heightened operational demands for the engine is required during takeoff or acceleration, which effectively opens the throat 150, permitting a greater flow capacity through the engine 10. The passive valve assembly 200 may also be structured to be closed, to be at least partially closed, or to close when lesser operational demands are required, such as at idle or during a flight cruise phase, which may increase engine efficiency. Furthermore, the passive valve assembly 200 may be structured to allow multiple, variable amounts of fluid to the nozzle 73, for example, based on different operational characteristics or demands of the engine 10, and thus tailored to the particular needs of the particular operational condition of the engine 10. As such, the passive valve assembly 200 may permit discrete flow rates, beyond just an open and closed positions.

In the case of a set of blades defining a throat, the passive valve assembly 200 may modulate the flow to one or more blades to reduce the cooling flow to increase performance as needed, such as at cruise, or increase cooling flow for improve cooling during heightened operational demands, such as during takeoff and climb. In the case of the blades, the passive valve assembly 200 may be structured to control the total cooling flow to the blades, and a balance between blade cooling and engine operability may be tailored to the present engine operational condition or needs. A set of holes similar to the exhaust holes 126 may be provided on the blade downstream of the throat defined between two adjacent blades to improve the control of the effective throat at the blades as the cooling is modulated. In the absence of the holes, a higher level of blade flow may decrease the effective throat, negatively affecting engine operability. Utilizing the holes downstream of the throat may offset this effect across a wide range of operational conditions.

Figure 7:
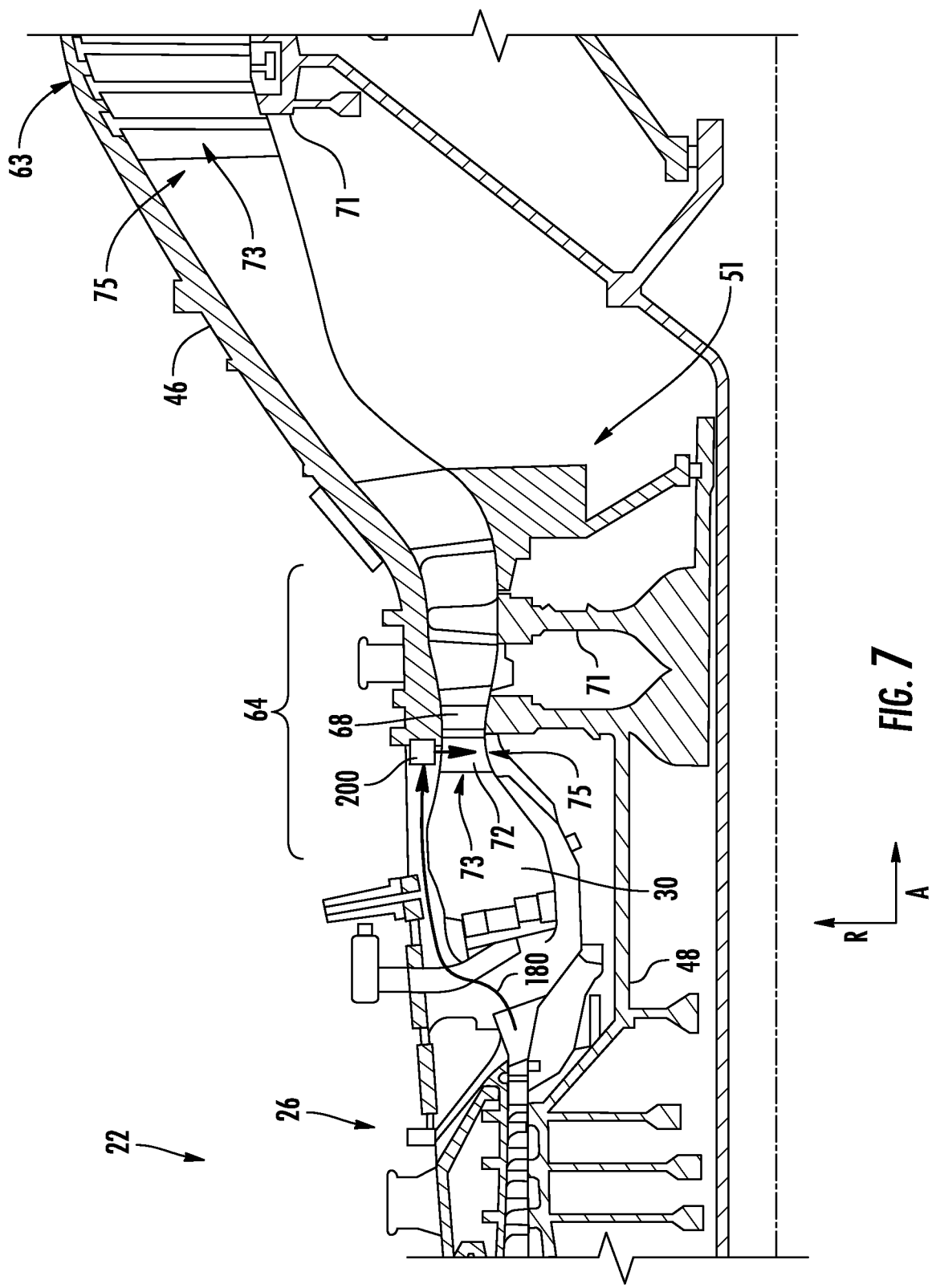
FIG. 7 is a schematic cross-sectional view of a portion of a gas turbine engine showing a cooling flowpath and a passive valve assembly according to one or more embodiments.

FIG. 7 is a schematic cross-sectional view of a portion of a gas turbine engine showing a cooling flowpath 180 and a passive valve assembly 200 according to one or more embodiments. According to one or more embodiments, the cooling flowpath 180 may pass through the fluid supply line 130. As shown in FIG. 7, a cooling flowpath 180 may extend from a compressor section 22 of the engine 10 to the passive valve assembly 200 on an outer side of the nozzle 73 along the radial direction R. According to one or more embodiments, the cooling flowpath 180 may extend from the HP compressor 26. According to one or more embodiments, the cooling flowpath 180 may extend from downstream of the HP compressor 26. The passive valve assembly 200 may selectively allow the cooling airflow from the cooling flowpath 180 to enter the nozzle 73 which may be exhausted from exhaust holes 126 described above. While FIGS. 2-7 are shown as including the passive valve assembly 200, the structures shown in FIGS. 2-7 may instead include a passive valve assembly 300 or a passive valve assembly 400 described below. Alternatively, the structures shown in FIGS. 2-7 may include a combination of two or more of the passive valve assembly 200, the passive valve assembly 300, and the passive valve assembly 400. Further, it will be appreciated that the cooling flowpath 180, although depicted as extending from an exit of the HP compressor 26 and around a combustor 30, in other embodiments, the cooling flowpath 180 may bleed airflow from the compressor section at any other suitable location upstream of the exit of the HP compressor 26.

Figure 8:
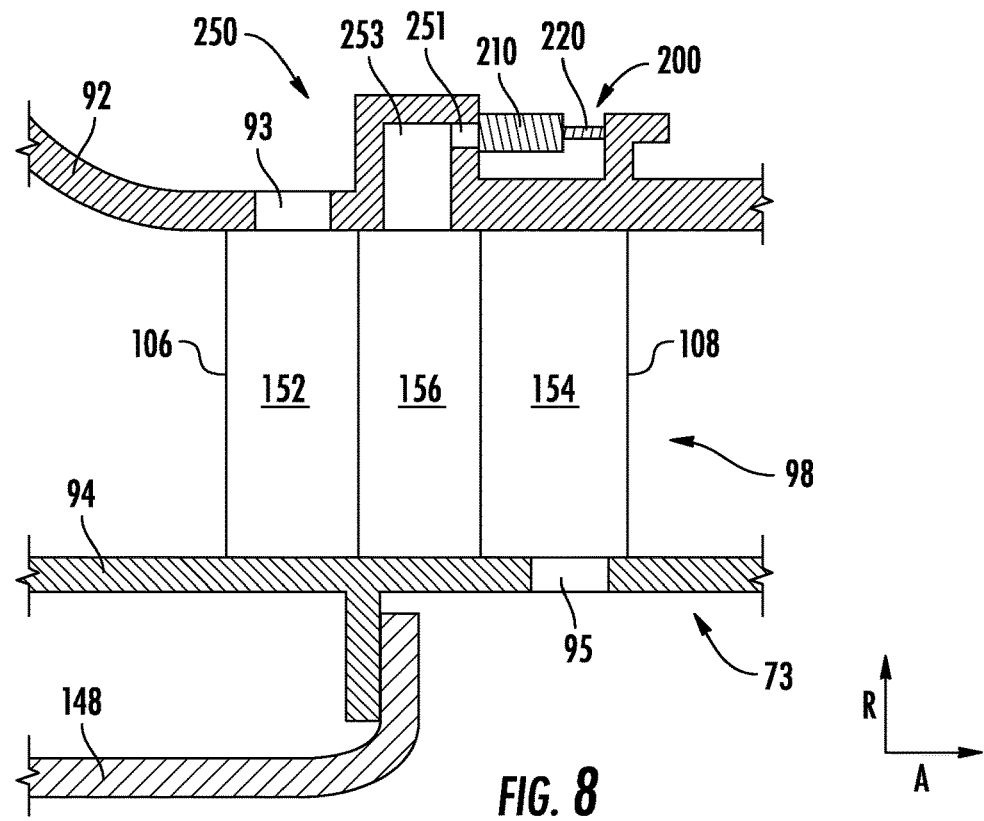
FIG. 8 is a schematic cross-sectional view of a nozzle and a passive valve assembly according to one or more embodiments.

FIG. 8 is a schematic cross-sectional view of a nozzle 73 and a passive valve assembly 200 according to one or more embodiments. The nozzle 73 may include an airfoil 98 extending between an outer band 92 and an inner band 94. An inner casing 148 may further be disposed on an inner side of the inner band 94 along the radial direction R. As described above, the airfoil 98 may include a leading edge 106 and a trailing edge 108, and may further include a leading edge passage 152, a trailing edge passage 154, and a suction side passage 156 formed therein. The suction side passage 156 is an example of a fluid passage defined within the airfoil 98. The outer band 92 may include a leading edge inlet 93 that opens into the leading edge passage 152, and the inner band 94 may include a trailing edge inlet 95 that opens into the trailing edge passage 154.

As shown in FIG. 8, the outer band 92 may include a radially extending portion 250 that extends outward in the radial direction R. The radially extending portion 250 may extend further outward in the radial direction R compared to the portions of the outer band 92 around the leading and trailing edge passages 152, 154. A cooling airflow inlet 251 may extend axially through a radially extending aft wall of the radially extending portion 250. The radially extending aft wall is an example of an inlet wall, and the cooling airflow inlet 251 is an example of a fluid inlet formed in the inlet wall. A connection passage 253 that extends radially is further formed in the radially extending portion 250 between radially extending forward and aft walls of the radially extending portion 250, extending to the suction side passage 156 of the airfoil 98 such that the connection passage 253 fluidly couples the cooling airflow inlet 251 and the suction side passage 156. According to one or more embodiments, the connection passage 253 may continuously extend annularly around the centerline 12 of the engine 10. Alternatively, a plurality of separate connection passages 253, one for each airflow inlet 251 or a set of airflow inlets 251, may be disposed around the centerline 12 of the engine 10.

Additionally, a passive valve assembly 200 may be disposed on the outer band 92. The passive valve assembly 200 may include an annular band 210 attached to the outer band 92 via a biasing structure 220. According to one or more embodiments, the biasing structure 220 may be a retaining clip. According to one or more embodiments, the biasing element 220 may be, for example, a W-clip or any suitable structure for attaching the annular band 210 to the outer band 92. The biasing structure 220 may further exert an axial force in the forward direction to press the annular band 210 against the cooling airflow inlet 251. According to one or more embodiments, the biasing structure 220 may be attached to another portion of the outer band 92. While the outer band 92 may be formed of metal, the annular band 210 may be formed of a material having a lower coefficient of expansion than the outer band 92. For example, the annular band 210 may include or be formed of ceramic matrix composite (CMC) materials which have a significantly lower coefficient of expansion than the outer band 92. Alternatively, the annular band 210 may be formed of ceramics such as silicon carbide, metals such as titanium alloys or titanium aluminide alloys, or any other materials having a coefficient of expansion lower than the outer band 92.

According to one or more embodiments, the annular band 210 is formed of a material having a coefficient of thermal expansion at or below 40% of the material of the outer band 92. According to one or more embodiments, the annular band 210 is formed of a material having a coefficient of thermal expansion at or below 35% of the material of the outer band 92. According to one or more embodiments, the annular band 210 is formed of a material having a coefficient of thermal expansion at or below 30% of the material of the outer band 92. According to one or more embodiments, the annular band 210 is formed of a material having a coefficient of thermal expansion at or below 25% of the material of the outer band 92. According to one or more embodiments, the annular band 210 is formed of a material having a coefficient of thermal expansion between 40% and 25% of the material of the outer band 92. According to one or more embodiments, the annular band 210 is formed of a material having a coefficient of thermal expansion between 35% and 25% of the material of the outer band 92. According to one or more embodiments, the annular band 210 is formed of a material having a coefficient of thermal expansion between 30% and 25% of the material of the outer band 92. According to one or more embodiments, the annular band 210 is formed of a material having a coefficient of thermal expansion between 40% and 30% of the material of the outer band 92. According to one or more embodiments, the annular band 210 is formed of a material having a coefficient of thermal expansion between 35% and 30% of the material of the outer band 92.

Figure 9:
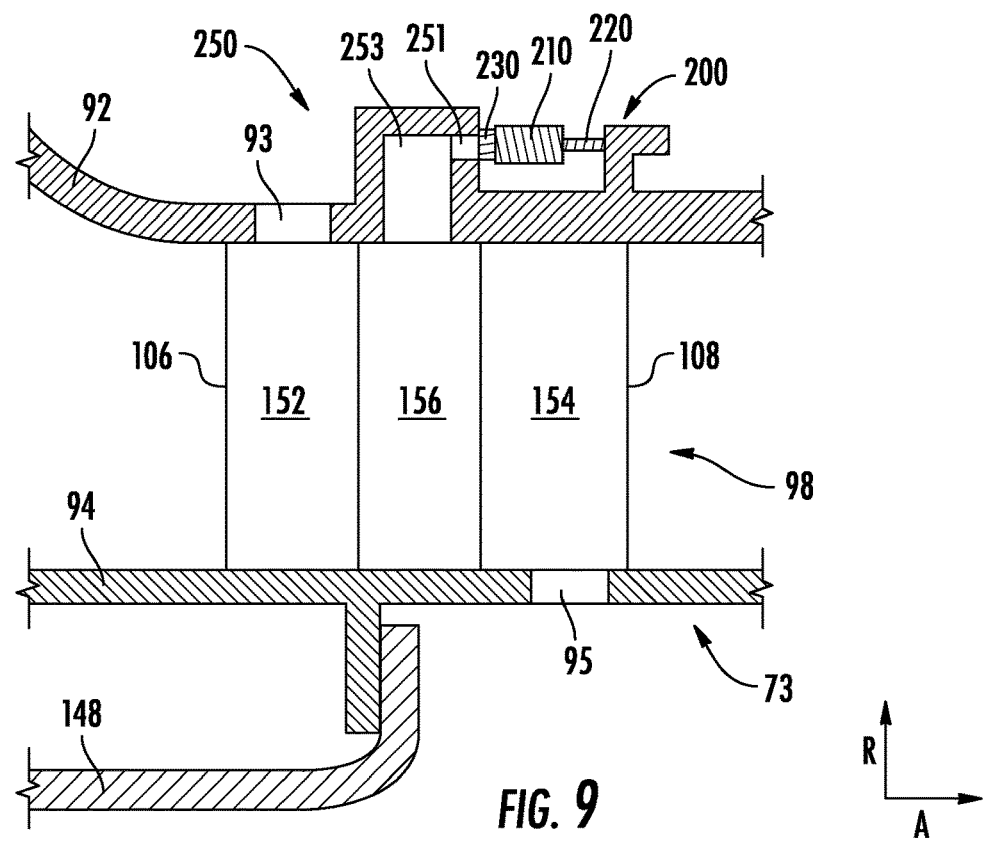
FIG. 9 is a schematic cross-sectional view of a nozzle and a passive valve assembly that includes a piston ring seal according to one or more embodiments.

Referring briefly to FIG. 9, a passive valve assembly 200 and a nozzle 73 in accordance with another exemplary embodiment of the present disclosure is provided. The nozzle 73 and the passive valve assembly 200 shown in FIG. 9 are similar to that shown in FIG. 8, except that a piston ring seal 230 is formed on a forward surface of the annular band 210. The piston ring seal 230 forms a seal against the cooling airflow inlet 251 when the annular band 210 is positioned aft of the cooling airflow inlet.

Figure 10A:
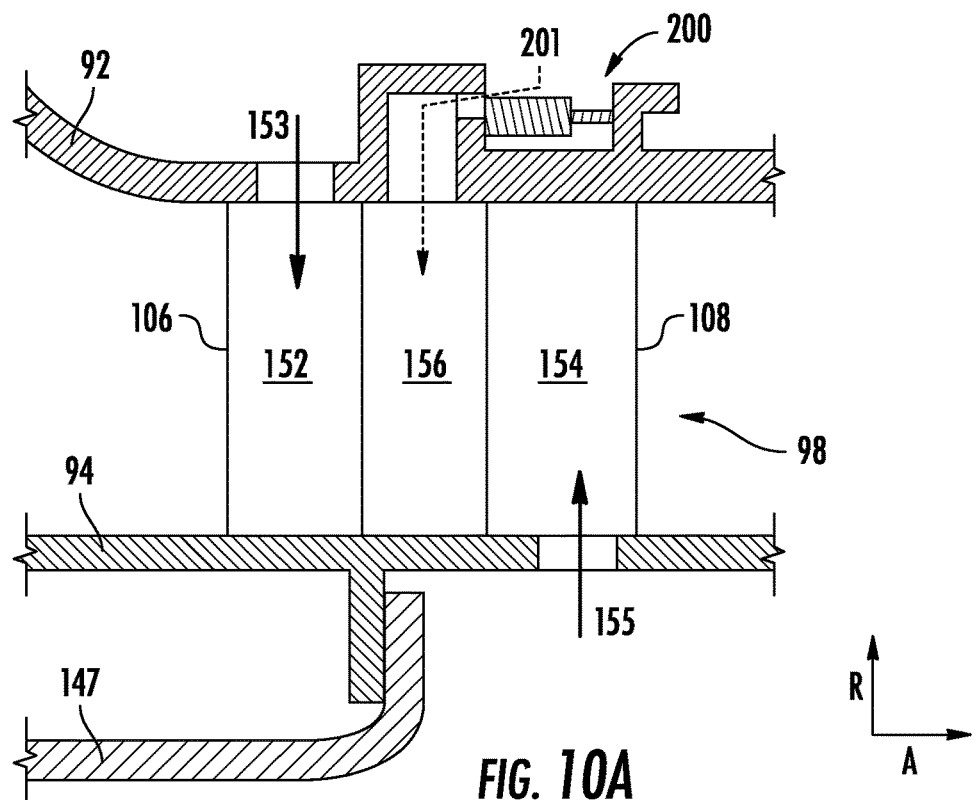
FIG. 10A is a schematic cross-sectional view of a nozzle and a passive valve assembly that is in a closed position according to one or more embodiments.
Figure 10B:
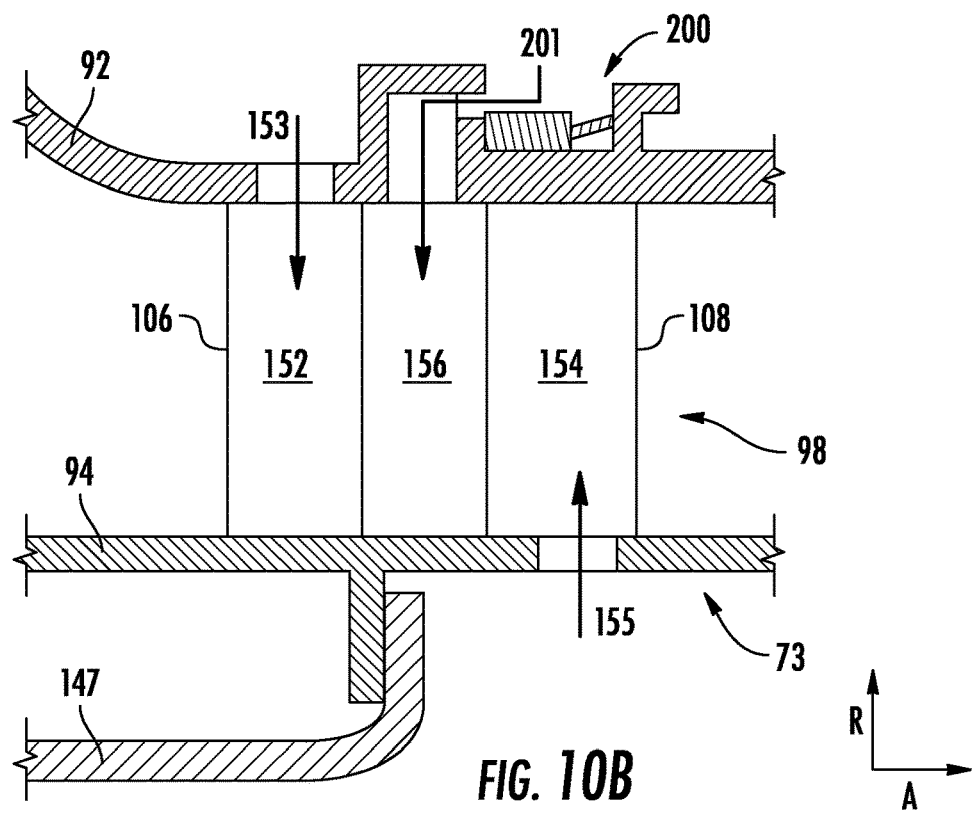
FIG. 10B is a schematic cross-sectional view of a nozzle and a passive valve assembly that is in an open position according to one or more embodiments.

Referring now to FIGS. 10A and 10B, schematic cross-sectional views are provided of a nozzle 73 and a passive valve assembly 200 in closed and open positions, respectively, according to one or more embodiments. As explained above, the outer band 92 has a higher coefficient of thermal expansion than the annular band 210. As such, as this section of the engine 10 heats up, the outer band 92 and the radially extending portion 250 thereof expands radially at a faster rate than the annular band 210. Due to this difference in coefficients of thermal expansion, as the outer band 92 and the annular band 210 are heated, the radially extending portion 250 and the cooling airflow inlet 251 formed therein move radially outward with respect to the annular band 210. As the temperatures of the radially extending portion 250 and the annular band 210 changes, the annular band 210 may move between relative positions partially or entirely covering the cooling airflow inlet 251 when the annular band 210 and the cooling airflow inlet 251 partially or entirely overlap, and relative positions not covering the cooling airflow inlet 251 at all when the annular band 210 and the cooling airflow inlet 251 do not overlap. According to one or more embodiments, a forward surface of the annular band 210 may be sized equal to or larger than the cooling airflow inlet 251 such that the annular band 210 may close the cooling airflow inlet 251 entirely. Alternatively, a forward surface of the annular band 210 may be sized smaller than the cooling airflow inlet 251 such that the annular band 210 allows some airflow to pass through the cooling airflow inlet in the closed position. The biasing structure 220 may be structured to allow the movement of the annular band 210 with respect to the outer band 92.

The closed position of FIG. 10A may occur during, for example, cruise operations of the engine 10 when the nozzle 73 and its surrounding components are relatively cool. In the example shown in FIG. 10A, the relative positions of the annular band 210 and the cooling airflow inlet 251 allow only a small amount of cooling airflow 201 to pass through the cooling airflow inlet 251. The cooling airflow 201 is an example of fluid flow provided to the fluid passage. The small opening may maintain backflow margin and minimize nozzle flow area. Alternatively, in the closed position, the cooling airflow 201 through the cooling airflow inlet 251 may be blocked entirely by the annular band 210. The open position of FIG. 10B may occur during, for example, high power conditions of the engine 10 when the nozzle 73 and its surrounding components are relatively hot. In the example shown in FIG. 10A, the relative positions of the annular band 210 and the cooling airflow inlet 251 allow cooling airflow 201 to freely pass through the cooling airflow inlet 251 to the suction side passage 156. As used herein, "closed" and "open" positions do not necessarily require the cooling airflow inlet 251 to be entirely closed or entirely open. It is noted that, if the piston ring seal 230 is formed on the forward surface of the annular band 210, the piston ring seal 230 blocks the cooling airflow 201 to the cooling airflow inlet 251 instead of or in addition to the annular band 210.

As shown in FIGS. 10A and 10B, a leading edge cooling airflow 153 may enter the leading edge passage 152 through the leading edge inlet 93 and a trailing edge cooling airflow 155 may enter the trailing edge passage 154 through the trailing edge inlet 95 regardless of the temperature of the outer band 92 and the inner band 94. Alternatively, valve assemblies may be disposed for controlling the leading and trailing edge cooling airflows 153, 155 as well. In one or more embodiments, the passive valve assembly 200 may be disposed at the leading edge inlet 93 or the trailing edge inlet 95.

Figure 11A:
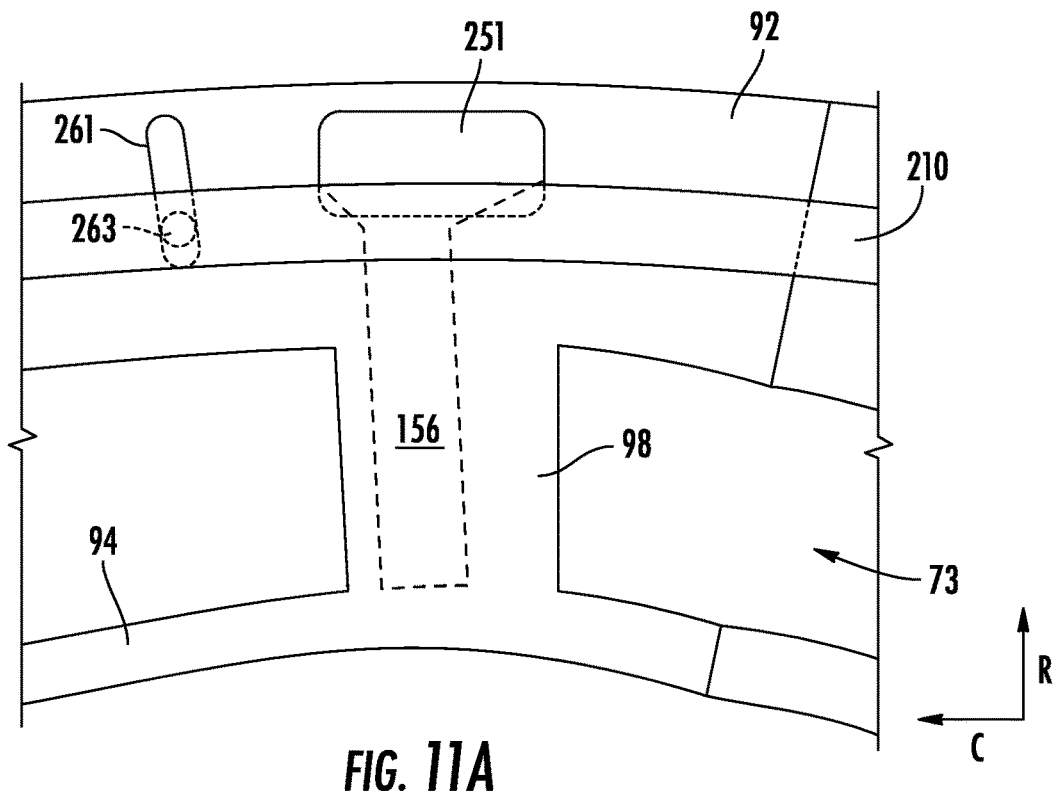
FIG. 11A is a schematic view from aft in an axial direction of a nozzle and a passive valve assembly that is in an open position according to one or more embodiments.
Figure 11B:
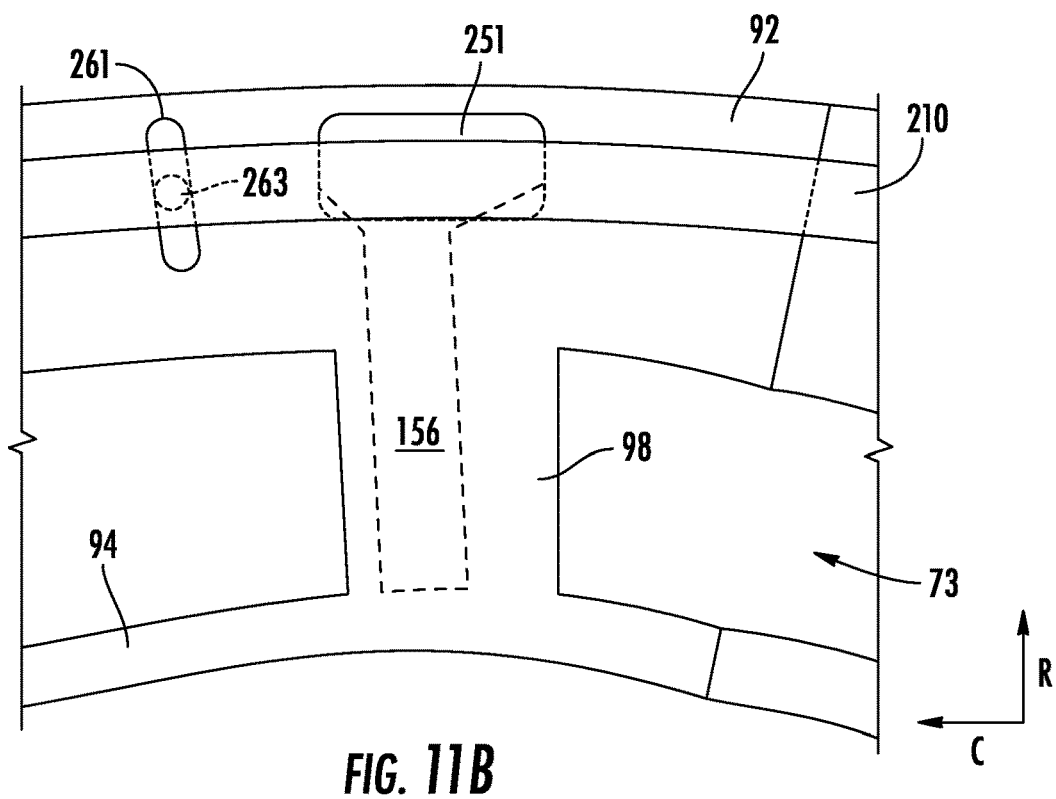
FIG. 11B is a schematic view from aft in an axial direction of a nozzle and a passive valve assembly that is in a closed position according to one or more embodiments.

FIG. 11A is a schematic view from aft in an axial direction A of a nozzle and a passive valve assembly that is in an open position, and FIG. 11B is a schematic view from aft in an axial direction A of a nozzle and a passive valve assembly that is in a closed position, according to one or more embodiments. In the closed position shown, for example, in FIG. 11B, when the outer band 92 and the annular band 210 are relatively cool, e.g., during cruise operations, the annular band 210 overlaps the cooling airflow inlet 251 in the axial direction A so as to allow only a small amount of cooling airflow 201 to pass through the cooling airflow inlet 251. Alternatively, in the closed position, the cooling airflow 201 through the cooling airflow inlet 251 may be blocked entirely by the annular band 210. In the open position shown, for example, in FIG. 11A, the relative positions of the annular band 210 and the cooling airflow inlet 251 may allow cooling airflow 201 to freely pass through the cooling airflow inlet 251 to the suction side passage 156. The outer band 92 may have a guide slot 261 formed therein, and the annular band 210 may have a corresponding positioning pin 263 extending in the axial direction A that is inserted into the guide slot 261. As the outer band 92 and the annular band 210 expand and contract at different rates with respect to each other, the positioning pin 263 moves in the guide slot 261 in the radial direction R while the outer band 92 and the annular band 210 remain aligned in the circumferential direction C. As the temperatures of the outer band 92 and the annular band 210 increase, the positioning pin 263 moves inward in the radial direction R within the guide slot 261, and as the temperatures of the outer band 92 and the annular band 210 decrease, the positioning pin 263 moves outward in the radial direction R within the guide slot 261. It is noted that, while the positioning pin 263 is described as moving within the guide slot 261 for ease of explanation, when the outer band 92 and the annular band 210 are heated, the guide slot 261 moves outward in the radial direction R at a faster rate than the positioning pin 263 such that the positioning pin 263 moves inward relative to the guide slot 261. However, when heated, the positioning pin 263 also moves outward in the radial direction R with respect to the centerline 12 of the engine 10, albeit at a slower rate than the guide slot 261. Furthermore, if the annular band 210 has a relatively larger height in the radial direction R, the guide slot 261 may be disposed in the annular band 210 and the positioning pin 263 may be formed on the outer band 92.

Figure 12:
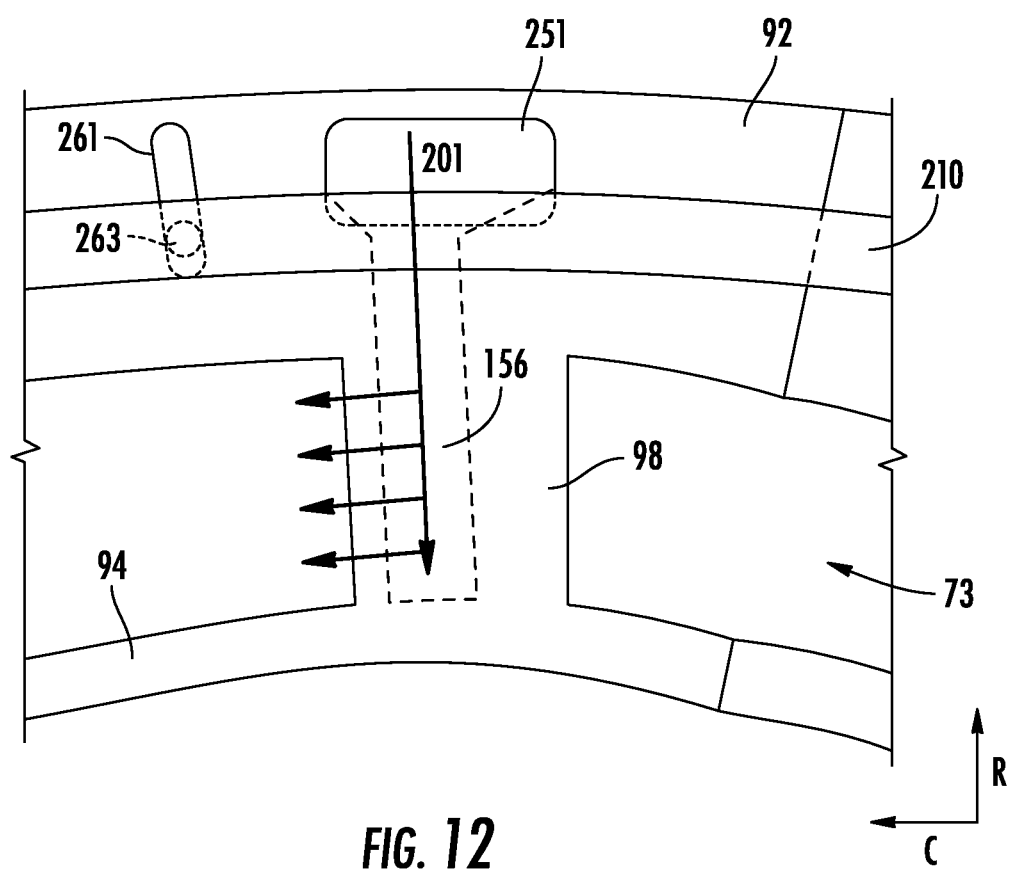
FIG. 12 is a schematic view from aft in an axial direction of a nozzle and a passive valve assembly that is in an open position, showing cooling airflow passing therethrough, according to one or more embodiments.

FIG. 12 is a schematic view from aft in an axial direction of a nozzle 73 and a passive valve assembly 200 that is in an open position according to one or more embodiments. As the passive valve assembly 200 is in the open position, the cooling airflow 201 enters the cooling airflow inlet 251 into the suction side passage 156, then is exhausted from the airfoil 98 via the exhaust holes 126 described above with respect to FIGS. 3-6.

Figure 13:
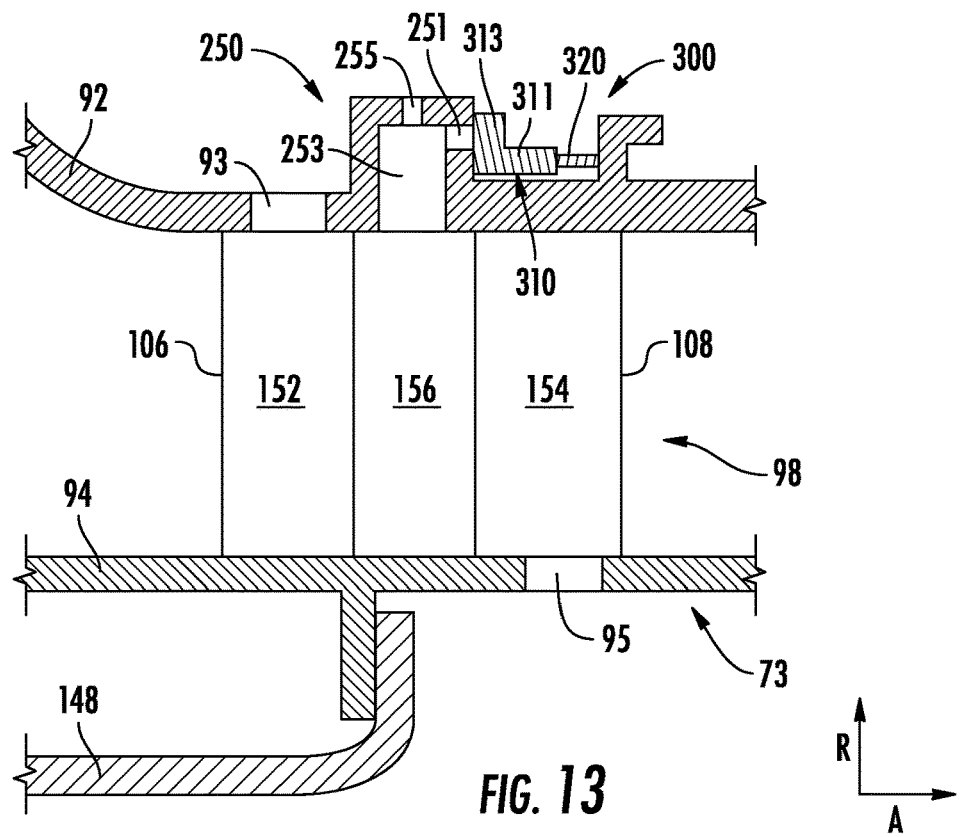
FIG. 13 is a schematic cross-sectional view of a nozzle and a passive valve assembly having a crenellation tab according to one or more embodiments.
Figure 14:
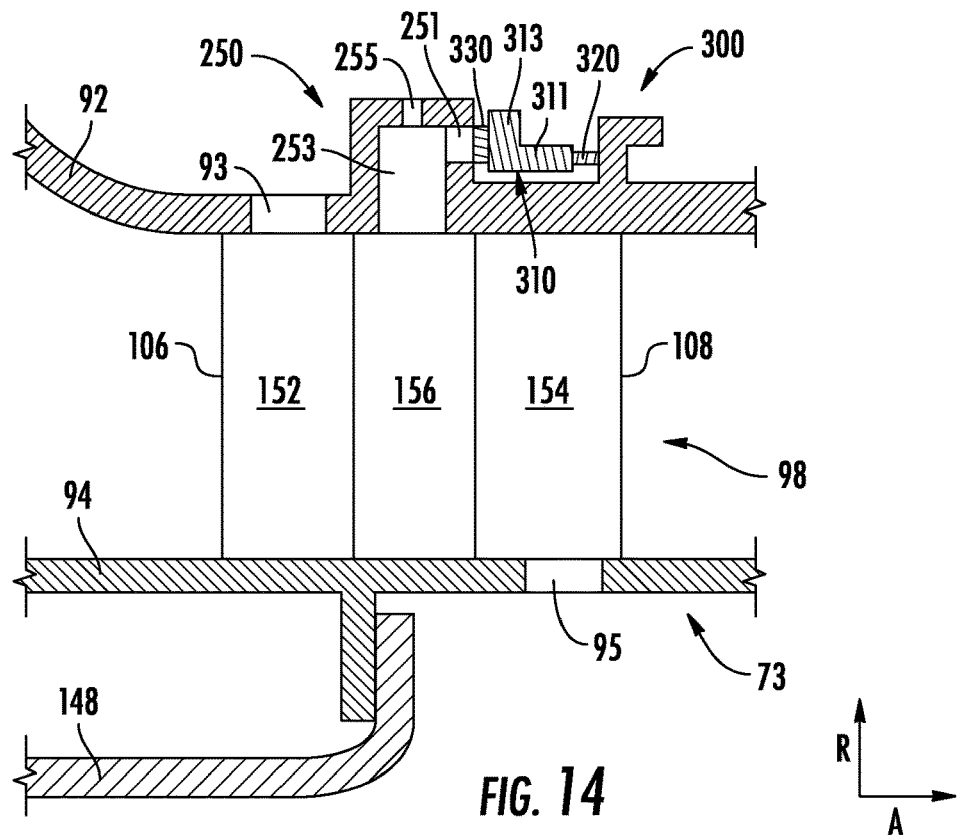
FIG. 14 is a schematic cross-sectional view of a nozzle and a passive valve assembly having a crenellation tab with a seal according to one or more embodiments.

FIG. 13 is a schematic cross-sectional view of a nozzle 73 and a passive valve assembly 300 according to one or more embodiments. The outer band 92 shown in FIG. 13 is similar to that shown in FIGS. 8-12, but the radially extending portion 250 may further include a bypass cooling hole 255. According to one or more embodiments, the bypass cooling hole 255 may be disposed on an axial wall connecting the radially extending forward and aft walls of the radially extending portion 250. The bypass cooling hole 255 may maintain baseline flow through the suction side passage 156 and the exhaust holes 126 to maintain backflow margin in the exhaust holes 126, a minimum level of component cooling, or a combination thereof. Although not shown, the bypass cooling hole 255 may be formed in the radially extending portion 250 in one or more embodiments shown in FIGS. 8-12 as well. The passive valve assembly 300 may be disposed on the outer band 92. The passive valve assembly 300 may include an annular band 310 attached to the outer band 92 via a biasing structure 320. According to one or more embodiments, the biasing structure 320 may be a retaining clip. The biasing structure 320 may be, for example, a W-clip or any suitable structure for attaching the annular band 310 to the outer band 92. The biasing structure 320 may further exert an axial force in the forward direction to press the annular band 310 against the cooling airflow inlet 251. According to one or more embodiments, the biasing structure 320 may be attached to another portion of the outer band 92. The annular band 310 may be formed of the same material as the annular band 210 described above. The annular band 310 may be formed of a ring portion 311 that is secured to the biasing structure 320 and a crenellation tab 313 extending outward in the radial direction R from the ring portion 311. In the closed position of the passive valve assembly 300 shown in FIG. 13, the crenellation tab 313 overlaps the cooling airflow inlet 251 in the axial direction A so as to block cooling airflow from entering the cooling airflow inlet 251. As shown in FIG. 14, a seal 330 may be formed on a forward surface of the crenellation tab 313 for sealing the cooling airflow inlet 251 in the closed position.

Figure 15A:
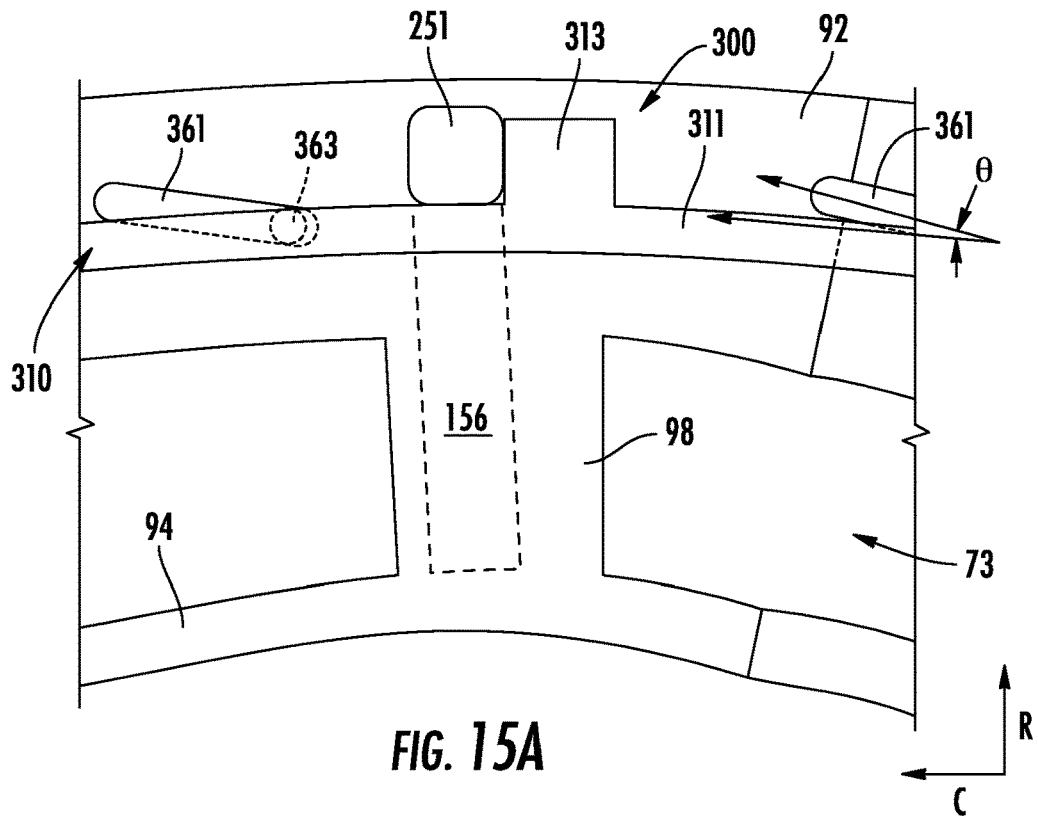
FIG. 15A is a schematic view from aft in an axial direction of a nozzle and a passive valve assembly having a crenellation tab that is in an open position according to one or more embodiments.
Figure 15B:
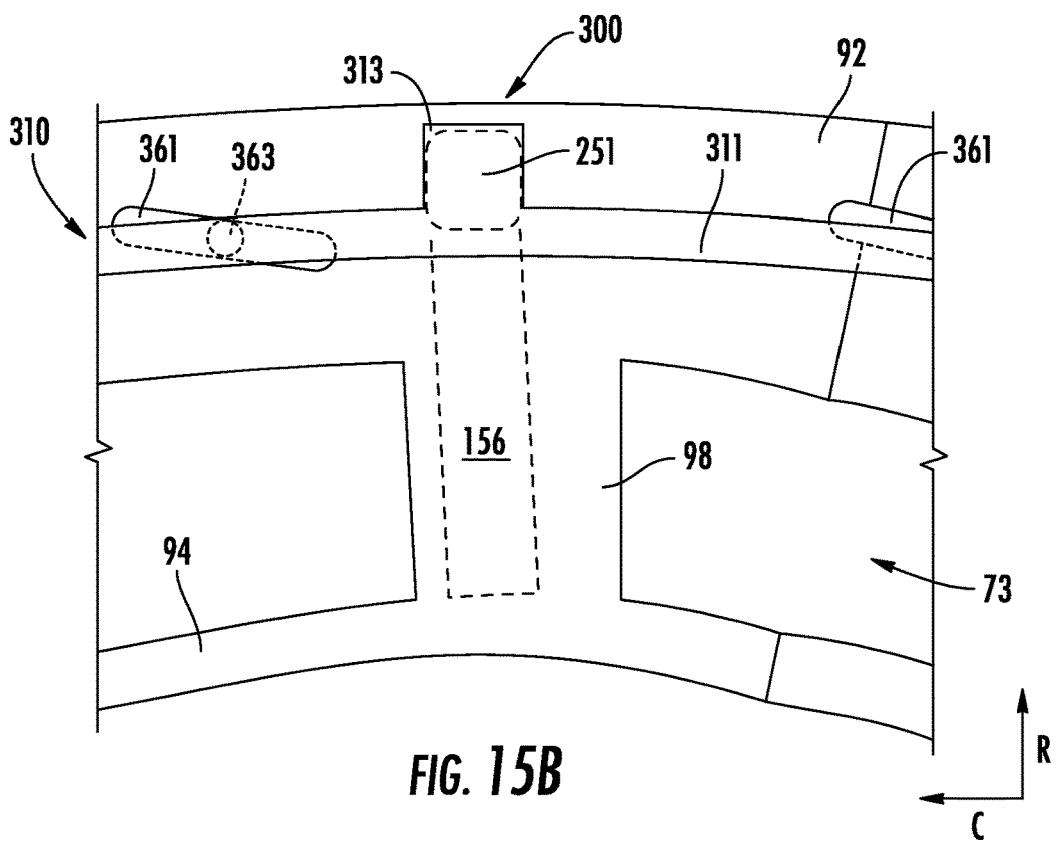
FIG. 15B is a schematic view from aft in an axial direction of a nozzle and a passive valve assembly having a crenellation tab that is in a closed position according to one or more embodiments.
Figure 15C:
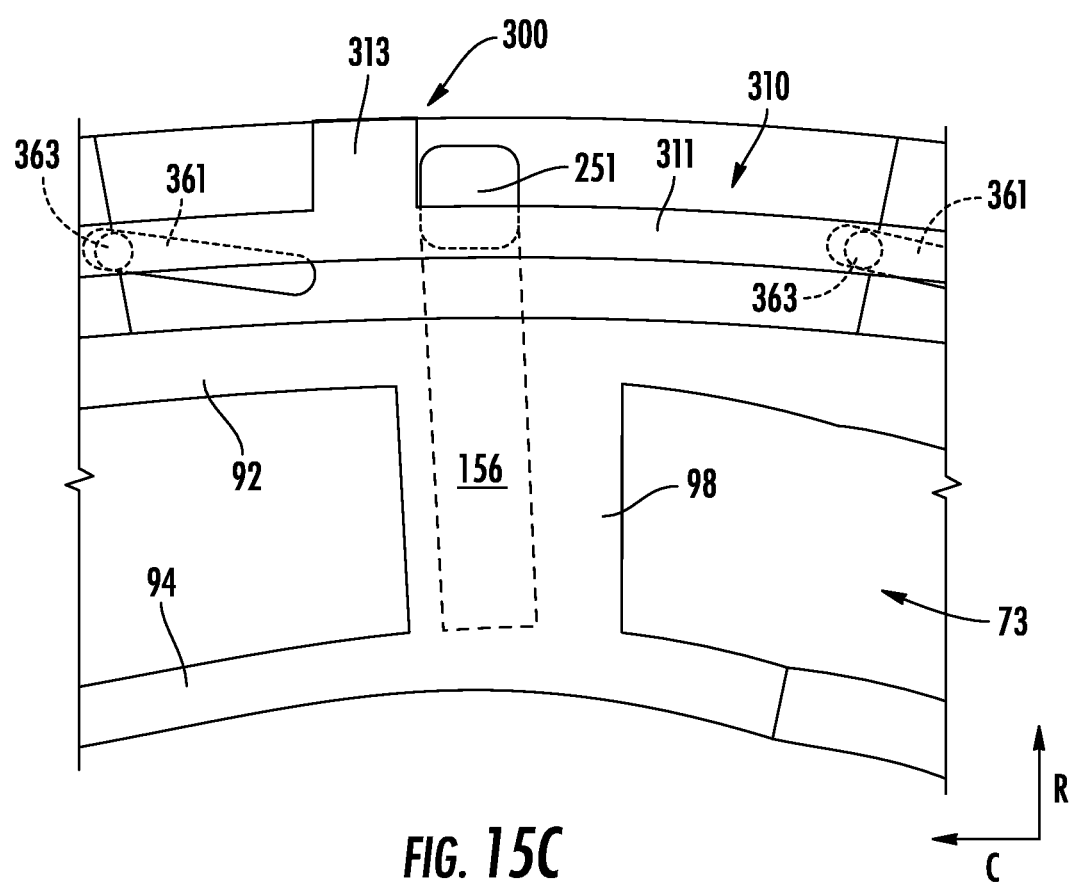
FIG. 15C is a schematic view from aft in an axial direction of a nozzle and a passive valve assembly having a crenellation tab that is in a partially open position according to one or more embodiments.

FIGS. 15A, 15B, and 15C are schematic views from aft in an axial direction of a nozzle 73 and a passive valve assembly 300 respectively in open, closed, and partially open positions according to one or more embodiments. FIG. 16A-16D are schematic cross-sectional views of a nozzle 73 and a passive valve assembly 300 in progression from the highest temperature condition to the lowest temperature condition according to one or more embodiments. The outer band 92 includes a guide slot 361 that extends obliquely in the circumferential and radial directions C, R.

According to one or more embodiments, the guide slot 361 extends in a direction that forms an angle θ of between 2 and 8 degrees with a tangent to the circumferential direction C. According to one or more embodiments, the guide slot 361 extends in a direction that forms an angle θ of between 4 and 6 degrees with a tangent to the circumferential direction C. According to one or more embodiments, the guide slot 361 extends in a direction that forms an angle θ of 5 degrees with a tangent to the circumferential direction C.

The annular band 310 includes a corresponding positioning pin 363 extending in the axial direction A that is inserted into the guide slot 361. As the outer band 92 and the annular band 310 expand and contract at different rates with respect to each other, the positioning pin 363 moves in the guide slot 361, and the oblique orientation of the guide slot 361 forces the positioning pin 363 and the annular band 310 to rotate in the circumferential direction C as they move in the radial direction R. As the temperatures of the outer band 92 and the annular band 310 increase, the positioning pin 363 moves inward in the radial direction R and clockwise in the circumferential direction C (when viewed from aft in an axial direction A) within the guide slot 361, and as the temperatures of the outer band 92 and the annular band 310 decrease, the positioning pin 363 moves outward in the radial direction R and counterclockwise in the circumferential direction C (when viewed from aft in an axial direction A) within the guide slot 361.

Figure 16A:
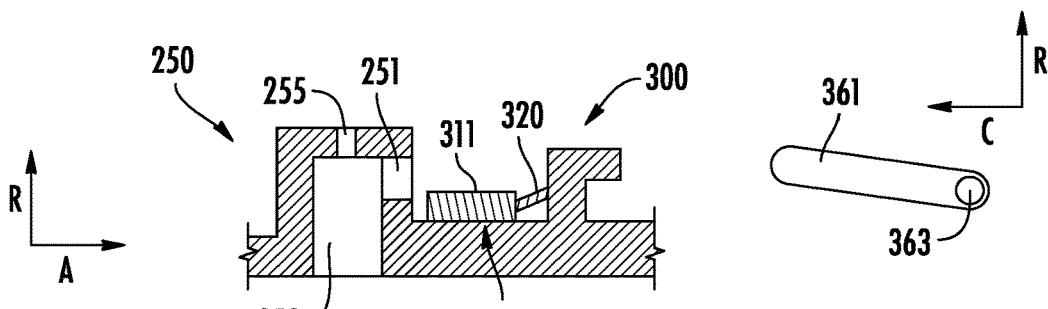
FIGS. 16A-16D are schematic cross-sectional views of a passive valve assembly having a crenellation tab in progression from the highest temperature condition to the lowest temperature condition according to one or more embodiments.

The open position shown in FIGS. 15A and 16A may occur when the outer band 92 and the annular band 310 are at the highest temperatures, which may occur, for example, at high power conditions. Due to the higher coefficient of thermal expansion, the outer band 92 expands further outward than the annular band 310, and the positioning pin 363 is at the innermost position within the guide slot 361. In this position, the crenellation tab 313 is to the side of the cooling airflow inlet 251 in the circumferential direction C and the ring portion 311 is disposed on an inner side of the cooling airflow inlet 251 in the radial direction R. Accordingly, the cooling airflow inlet 251 is open and allows cooling airflow to pass therethrough. Thus, at high temperature operations such as high power conditions, a high volume of cooling airflow may be exhausted from the exhaust holes 126 downstream of the throat 150.

Figure 16B:
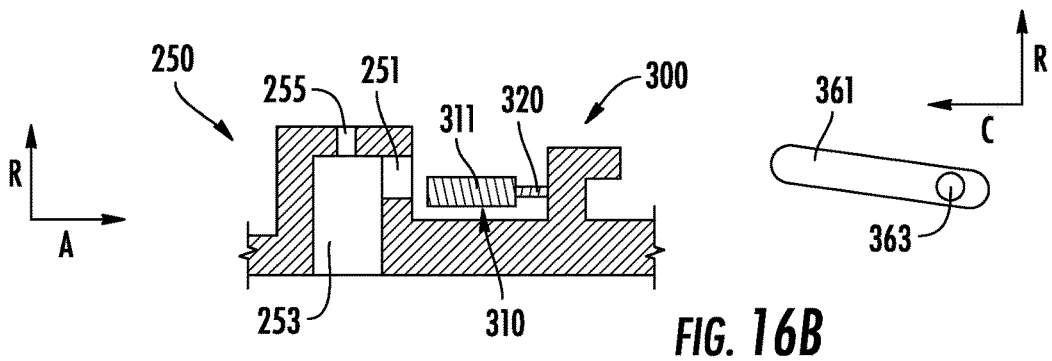
Figure 16C:
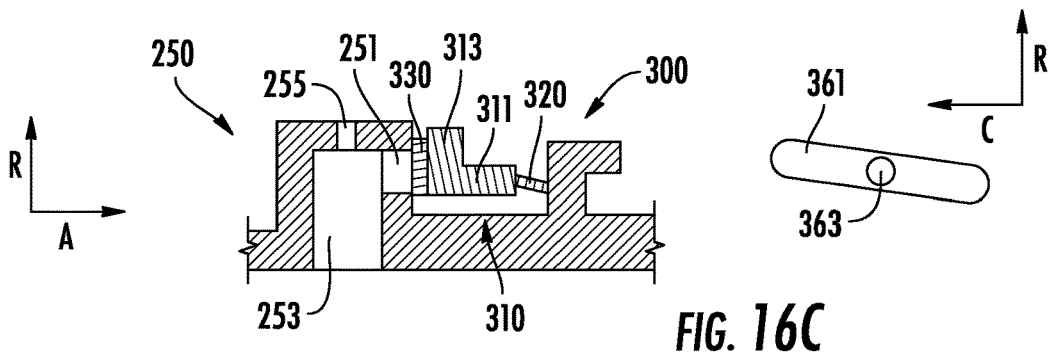

The closed position shown in FIGS. 15B and 16C may occur when the outer band 92 and the annular band 310 are at intermediate temperatures, which may occur, for example, at cruise operations. Due to the higher coefficient of thermal expansion, the outer band 92 contracts at a faster rate than the annular band 310, and the positioning pin 363 is at the central position within the guide slot 361. In this position, the crenellation tab 313 overlaps the cooling airflow inlet 251 in the axial direction A. Accordingly, the cooling airflow inlet 251 is closed by the crenellation tab 313 and cooling airflow is blocked from passing therethrough. Thus, at intermediate temperature operations such as cruise operations, the only cooling airflow exhausted from the exhaust holes 126 downstream of the throat 150 may be that passing through the bypass cooling hole 255. Alternatively, the annular band 310 may allow a small volume of cooling airflow to enter the cooling airflow inlet 251 in the closed position. While non-limiting examples of the crenellation tab 313 and the cooling airflow inlet 251 are shown, the crenellation tab 313 and the cooling airflow inlet 251 may take other shapes and arrangements.

The partially open position shown in FIG. 16B occurs between the open position shown in FIG. 15A and FIG. 16A and the closed position shown in FIGS. 15B and 16C and may be occur during normal climb operations that are slightly cooler than the high power conditions. While FIG. 16B shows the cooling airflow inlet 251 being partially blocked by the ring portion 311 of the annular band 310, alternatively, the annular band 310 may be structured such that the ring portion 311 remains entirely below the cooling airflow inlet 251 in this position as well.

Figure 16D:
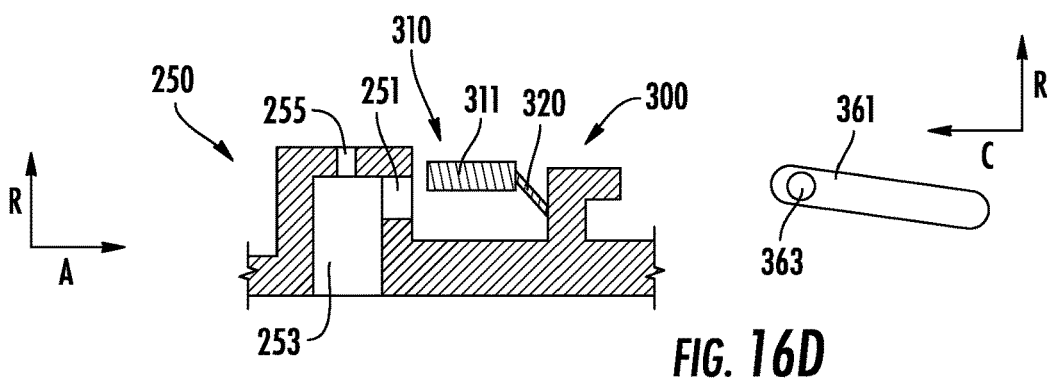

The partially open position shown in FIGS. 15C and 16D may occur when the outer band 92 and the annular band 310 are at the lowest temperatures, which may occur, for example, at startup when the engine 10 is cold. Due to the higher coefficient of thermal expansion, the outer band 92 contracts further inward than the annular band 310, and the positioning pin 363 is at the outermost position within the guide slot 361. In this position, the crenellation tab 313 is to the side of the cooling airflow inlet 251 in the circumferential direction C and the ring portion 311 is disposed on an inner side of the cooling airflow inlet 251 in the radial direction R, although as shown in FIG. 15C, there may be overlap between the inner portion of the cooling airflow inlet 251 and the outer portion of the ring portion 311 such that the cooling airflow inlet 251 is only partially open. The partially open cooling airflow inlet 251 allows cooling airflow to pass therethrough, although at a lower volume than in the open position shown in FIG. 10A. Thus, at low temperature operations such startup, a volume of cooling airflow may be exhausted from the exhaust holes 126 downstream of the throat 150. Alternatively, the annular band 310 may be structured such that the cooling airflow inlet 251 is entirely open or entirely closed in this position.

Figure 17A:
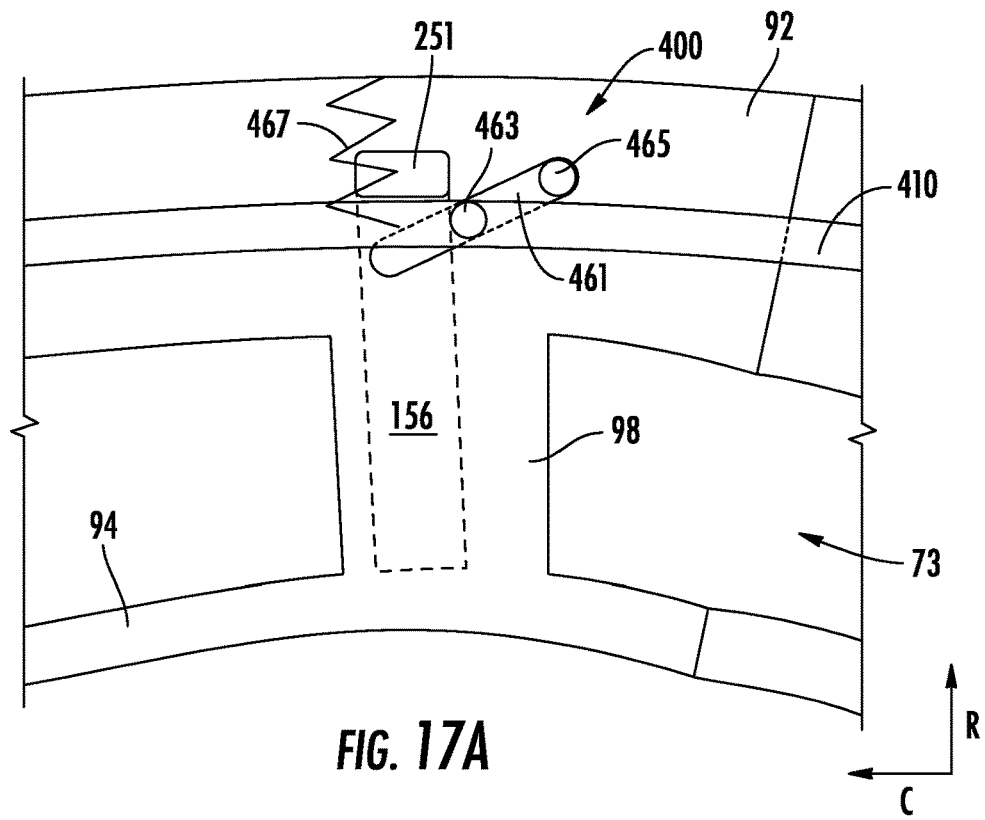
FIGS. 17A-17C are schematic views of a nozzle and a passive valve assembly having a seal arm in progression from the highest temperature condition to the lowest temperature condition according to one or more embodiments.
Figure 17B:
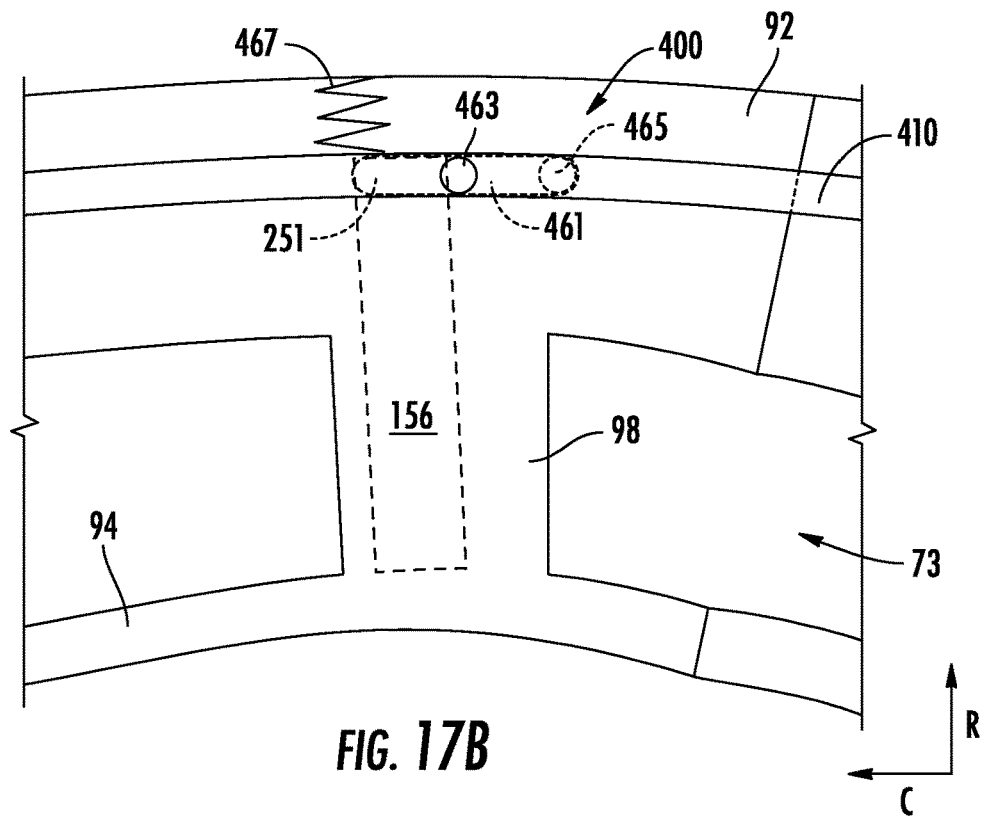
Figure 17C:
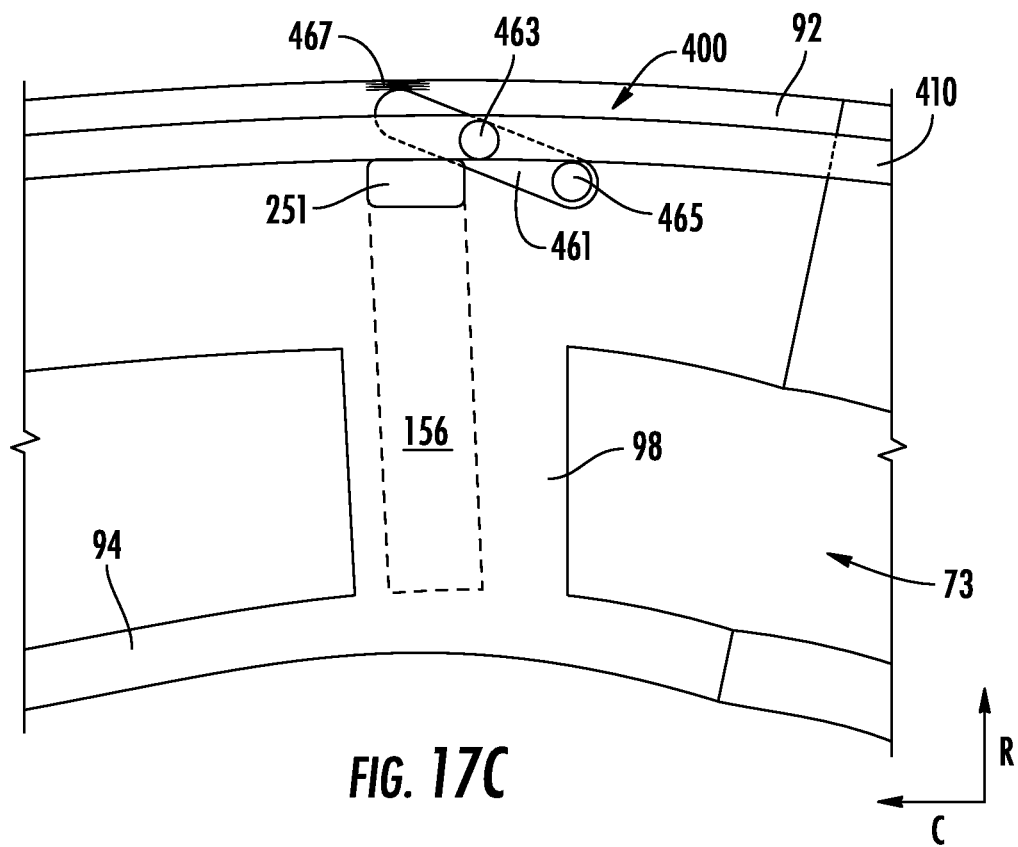
Figure 18:
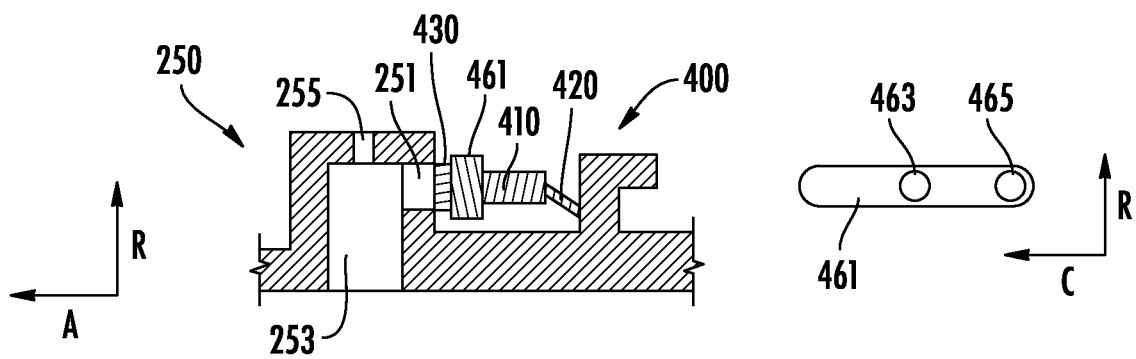
FIG. 18 is a schematic cross-sectional view of a passive valve assembly having a seal arm that is in a closed position according to one or more embodiments.

FIGS. 17A-17C are schematic views from aft in an axial direction A of a nozzle and a passive valve assembly 400 in progression from the highest temperature condition to the lowest temperature condition according to one or more embodiments, and FIG. 18 is a schematic cross-sectional view of a passive valve assembly 400 having an annular band 410 and a seal arm 461 that is in a closed position according to one or more embodiments.

According to one or more embodiments, a passive valve assembly 400 may include an annular band 410 and a seal arm 461 that is pivotably attached at a central position to the annular band 410 via a pivot pin 463 and rotatably attached at a first end to the outer band 92 via an actuation pin 465. The passive valve assembly 400 may further include a biasing structure 467 attached to a second end of the seal arm 461. According to one or more embodiments, the biasing structure 467 may be a spring clip. The annular band 410 may be formed of the same material as the annular band 210 described above. The seal arm 461 may be formed of any suitable material and, in one or more embodiments, includes or is formed of metal. Alternatively, the seal arm 461 may include or be formed of CMC.

The annular band 410 may be attached to the outer band 92 via a biasing structure 420. According to one or more embodiments, the biasing structure 420 may be a retaining clip. The biasing structure 420 may be, for example, a W-clip or any suitable structure for attaching the annular band 410 to the outer band 92. The biasing structure 420 may further exert an axial force in the forward direction to press the annular band 410 against the cooling airflow inlet 251. According to one or more embodiments, the biasing structure 420 may be attached to another portion of the outer band 92.

As the temperatures of the outer band 92 and the annular band 410 changes, the outer band 92 expands or contracts at a faster rate than the annular band 410 due to its larger coefficient of expansion. Thus, the outer band 92 moves inward and outward with respect to the annular band 410, and the first end of the seal arm 461 moves along the actuation pin 465 attached to the outer band 92. As the first end of the seal arm 461 moves with respect to the annular band 410, the seal arm 461 pivots about the pivot pin 463, and the second end of the seal arm 461 moves inward and outward in the radial direction R.

The open position shown in FIG. 17A may occur when the outer band 92 and the annular band 410 are at the highest temperatures, which may occur, for example, at high power conditions. Due to the higher coefficient of thermal expansion, the outer band 92 expands further outward than the annular band 410, and the first end of the seal arm 461 is moved to an outer position by the expanding outer band 92 via the actuation pin 465, and the second end of the seal arm 461 is pivoted to an inner position about the pivot pin 463. In this position, the second end of the seal arm is disposed on an inner side of the cooling airflow inlet 251 in the radial direction R. Accordingly, the cooling airflow inlet 251 is open and allows cooling airflow to pass therethrough. Thus, at high temperature operations such as high power conditions, a high volume of cooling airflow may be exhausted from the exhaust holes 126 downstream of the throat 150.

The closed position shown in FIGS. 17B and 18 may occur when the outer band 92 and the annular band 410 are at intermediate temperatures, which may occur, for example, at cruise operations. Due to the higher coefficient of thermal expansion, the outer band 92 contracts at a faster rate than the annular band 410, and the first end of the seal arm 461 is moved to an intermediate position by the contracting outer band 92 via the actuation pin 465, and the second end of the seal arm 461 is pivoted to an intermediate position about the pivot pin 463. In this position, the seal arm 461 overlaps the cooling airflow inlet 251 in the axial direction A. Accordingly, the cooling airflow inlet 251 is closed by the seal arm 461 or a seal 430 disposed on a forward surface of the seal arm 461, and cooling airflow is blocked from passing therethrough. Thus, at intermediate temperature operations such as cruise operations, the only cooling airflow exhausted from the exhaust holes 126 downstream of the throat 150 may be that passing through the bypass cooling hole 255. Alternatively, the annular band 410 may allow a small volume of cooling airflow to enter the cooling airflow inlet 251 in the closed position.

Although not shown, a partially open position similar to that shown in FIG. 16B may occur between the open position shown in FIG. 17A and the closed position shown in FIGS. 17B and 18 and may be occur during normal climb operations that are slightly cooler than the high power conditions.

The partially open position shown in FIG. 17C may occur when the outer band 92 and the annular band 410 are at the lowest temperatures, which may occur, for example, at startup when the engine 10 is cold. Due to the higher coefficient of thermal expansion, the outer band 92 contracts further inward than the annular band 410, and the first end of the seal arm 461 is moved to an inner position by the contracting outer band 92 via the actuation pin 465, and the second end of the seal arm 461 is pivoted to an outer position about the pivot pin 463. In this position, the seal arm 461 is to outer side of the cooling airflow inlet 251 in the radial direction R such that the cooling airflow inlet 251 is open. The open cooling airflow inlet 251 allows cooling airflow to pass therethrough. Thus, at low temperature operations such startup, a volume of cooling airflow may be exhausted from the exhaust holes 126 downstream of the throat 150. Alternatively, the seal arm 461 may be structured such that the cooling airflow inlet 251 is only partially open in this position.

The biasing structure 467 may press on the second end of the seal arm 461 inward in the radial direction R. If the seal arm 461, the pivot pin 463, the actuation pin 465, or any combination thereof fails, the biasing structure 467 may exert a force on the second end of the seal arm 461 in the radial direction R to keep the second end of the seal arm 461 at an inner position such that the cooling airflow inlet 251 remains in an open position. Accordingly, during such conditions, the engine 10 can continue to operate during high power conditions.

Figure 19A:
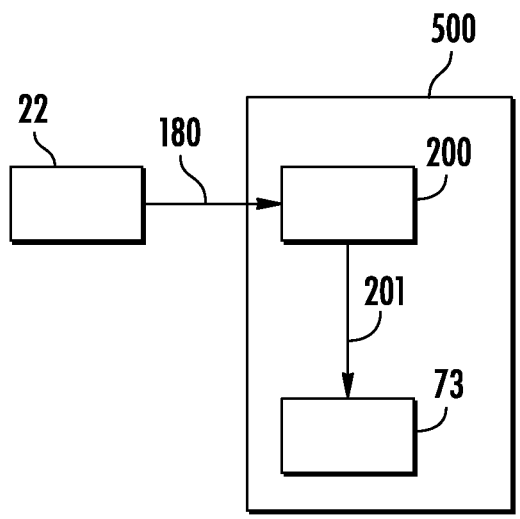
FIG. 19A-19C are schematic diagrams of a nozzle and a passive valve assembly according to one or more embodiments.
Figure 19B:
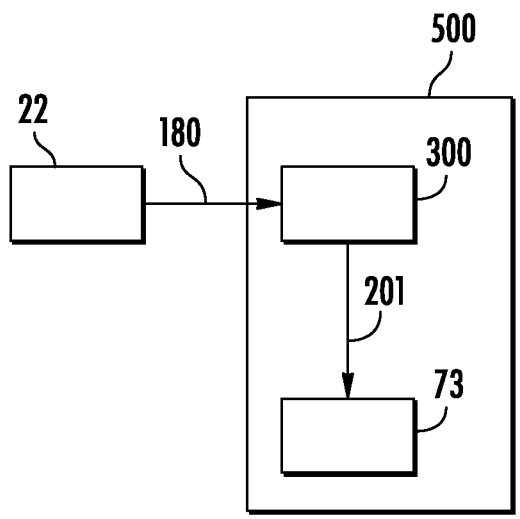
Figure 19C:
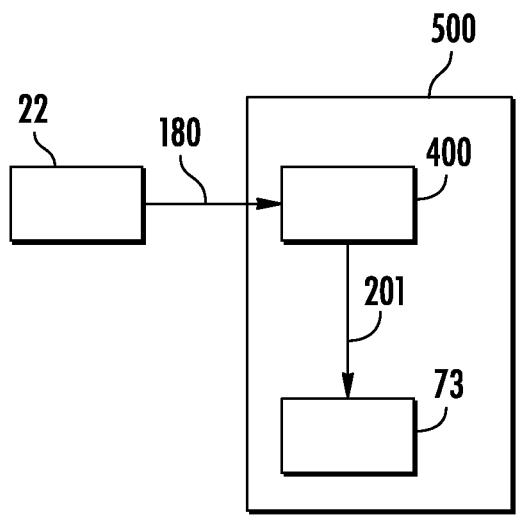

FIG. 19A shows an inducer 500 including a passive valve assembly 200 that receives airflow from the cooling flowpath 180 from compressor section 22, and selectively providing cooling airflow 201 to a nozzle 73 of the inducer 500. FIG. 19B shows an inducer 500 including a passive valve assembly 300 that receives airflow from the cooling flowpath 180 from compressor section 22, and selectively providing cooling airflow 201 to a nozzle 73 of the inducer 500. FIG. 19C shows an inducer 500 including a passive valve assembly 400 that receives airflow from the cooling flowpath 180 from compressor section 22, and selectively providing cooling airflow 201 to a nozzle 73 of the inducer 500. According to one or more embodiments, the inducer 500 with variable flow due to the passive valve assembly 200, 300, 400 may control one or more of the cooling flows into the nozzle 73.

This written description uses examples to disclose embodiments, including the best mode, and also to enable any person skilled in the art to practice the embodiments and modifications thereof, including making and using any devices or systems and performing any incorporated methods. The patentable scope is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A nozzle assembly for a gas turbine engine comprises a nozzle comprising a first material defining a first coefficient of thermal expansion, the nozzle comprising an airfoil defining a fluid passage therein; an inlet wall defining a fluid inlet that is fluidly connected to the fluid passage; and a passive valve assembly comprising an annular band, the annular band comprising a second material having a second coefficient of thermal expansion less than the first coefficient of thermal expansion such that the passive valve assembly is at least partially moveable relative to the fluid inlet.

The nozzle assembly of one or more of these clauses, wherein the passive valve assembly is configured to move between a closed position in which the fluid inlet is blocked by the passive valve assembly and an open position in which the fluid inlet is not blocked by passive valve assembly.

The nozzle assembly of one or more of these clauses, wherein the passive valve assembly is configured to move to the closed position during a cruise operation of the gas turbine engine.

The nozzle assembly of one or more of these clauses, wherein the nozzle is a first stage nozzle for a high pressure turbine of the gas turbine engine; and wherein the fluid passage of the airfoil is fluidly connected to exhaust holes formed on an outer wall of the airfoil downstream of a throat of the gas turbine engine.

The nozzle assembly of one or more of these clauses, wherein the second material is a ceramic matrix composite.

The nozzle assembly of one or more of these clauses, wherein the second coefficient of thermal expansion is between 40% and 25% of the first coefficient of thermal expansion.

The nozzle assembly of one or more of these clauses, wherein the fluid inlet is configured to be fluidly connected to a compressor section of the gas turbine engine to receive airflow therefrom.

The nozzle assembly of one or more of these clauses, wherein the inlet wall is formed on an outer band of the nozzle.

The nozzle assembly of one or more of these clauses, wherein the inlet wall extends in a radial direction of the gas turbine engine, and wherein the fluid inlet extends in an axial direction of the gas turbine engine.

The nozzle assembly of one or more of these clauses, wherein a seal is disposed on the annular band, and wherein the seal is configured to block at least a portion of a fluid flow from entering the fluid inlet at predetermined temperatures.

The nozzle assembly of one or more of these clauses, wherein the seal is a piston ring seal.

The nozzle assembly of one or more of these clauses, wherein the nozzle defines a guide slot extending in a radial direction of the gas turbine engine; wherein a positioning pin is formed on the annular band and disposed in the guide slot; and wherein the positioning pin is configured to move in the radial direction within the guide slot as the nozzle expands or contracts relative to the annular band due to a difference between the first and second coefficients of thermal expansion.

The nozzle assembly of one or more of these clauses, wherein the annular band comprises a ring portion and a tab; and wherein the tab is configured to block at least a portion of a fluid flow from entering the fluid inlet at predetermined temperatures.

The nozzle assembly of one or more of these clauses, wherein the nozzle defines a guide slot extending obliquely in a radial direction and in a circumferential direction of the gas turbine engine; wherein a positioning pin is formed on the annular band and disposed in the guide slot; and wherein the guide slot forces the positioning pin to move obliquely in the radial and circumferential directions as the nozzle expands or contracts relative to the annular band due to a difference between the first and second coefficients of thermal expansion.

The nozzle assembly of one or more of these clauses, wherein the guide slot extends in a direction that forms an angle of between 2 and 8 degrees with a tangent to the circumferential direction.

The nozzle assembly of one or more of these clauses further comprising a seal arm disposed between the annular band and the inlet wall and having a first end and a second end; an actuation pin, wherein the first end of the seal arm is rotatably attached to the inlet wall via the actuation pin; and a pivot pin, wherein a portion of the seal arm between the first and second ends is pivotably attached to the annular band via the pivot pin, and wherein the second end of the seal arm or a seal disposed on the second end of the seal arm is configured to block at least a portion of a fluid flow from entering the fluid inlet at predetermined temperatures.

The nozzle assembly of one or more of these clauses, further comprising a biasing structure attached to the second end of the seal arm to bias the second end in a radial direction of the gas turbine engine.

The nozzle assembly of one or more of these clauses, wherein the passive valve assembly is configured to move between a blocking position and an open position, and wherein the passive valve assembly reduces an airflow through the fluid inlet when in the blocking position relative to the open position.

A gas turbine engine comprises a nozzle assembly comprising a nozzle comprising a first material defining a first coefficient of thermal expansion, the nozzle comprising an airfoil defining a fluid passage therein; an inlet wall coupled to or formed integrally with the nozzle and defining a fluid inlet that is fluidly connected to the fluid passage to provide a fluid flow to the fluid passage; and a passive valve assembly comprising an annular band, the annular band comprising a second material having a second coefficient of thermal expansion less than the first coefficient of thermal expansion such that the passive valve assembly is at least partially moveable relative to the fluid inlet.

The gas turbine of one or more of these clauses, further comprising a compressor section; a combustor section downstream of the compressor section; and a turbine section downstream of the combustor section; wherein the nozzle is a first stage nozzle of the turbine section; and wherein the fluid inlet is fluidly coupled to the compressor section via a cooling flowpath that bypasses the combustor section.

What is claimed is:

1. A nozzle assembly for a gas turbine engine, the nozzle assembly comprising:
   a nozzle comprising a first material defining a first coefficient of thermal expansion, the nozzle comprising an airfoil defining a fluid passage therein;
   an inlet wall defining a fluid inlet that is fluidly connected to the fluid passage; and
   a passive valve assembly comprising an annular band, the annular band comprising a second material having a second coefficient of thermal expansion less than the first coefficient of thermal expansion such that the passive valve assembly is at least partially moveable relative to the fluid inlet.

2. The nozzle assembly according to claim 1, wherein the passive valve assembly is configured to move between a closed position in which the fluid inlet is blocked by the passive valve assembly and an open position in which the fluid inlet is not blocked by passive valve assembly.

3. The nozzle assembly according to claim 2, wherein the passive valve assembly is configured to move to the closed position during a cruise operation of the gas turbine engine.

4. The nozzle assembly according to claim 1, wherein the nozzle is a first stage nozzle for a high pressure turbine of the gas turbine engine; and wherein the fluid passage of the airfoil is fluidly connected to exhaust holes formed on an outer wall of the airfoil downstream of a throat of the gas turbine engine.

5. The nozzle assembly according to claim 1, wherein the second material is a ceramic matrix composite.

6. The nozzle assembly according to claim 1, wherein the second coefficient of thermal expansion is between 40% and 25% of the first coefficient of thermal expansion.

7. The nozzle assembly according to claim 1, wherein the fluid inlet is configured to be fluidly connected to a compressor section of the gas turbine engine to receive airflow therefrom.

8. The nozzle assembly according to claim 1, wherein the inlet wall is formed on an outer band of the nozzle.

9. The nozzle assembly according to claim 1, wherein the inlet wall extends in a radial direction of the gas turbine engine; and wherein the fluid inlet extends in an axial direction of the gas turbine engine.

10. The nozzle assembly according to claim 1, wherein a seal is disposed on the annular band; and wherein the seal is configured to block at least a portion of a fluid flow from entering the fluid inlet at predetermined temperatures.

11. The nozzle assembly according to claim 10, wherein the seal is a piston ring seal.

12. The nozzle assembly according to claim 1, wherein the nozzle defines a guide slot extending in a radial direction of the gas turbine engine; wherein a positioning pin is formed on the annular band and disposed in the guide slot; and wherein the positioning pin is configured to move in the radial direction within the guide slot as the nozzle expands or contracts relative to the annular band due to a difference between the first and second coefficients of thermal expansion.

13. The nozzle assembly according to claim 1, wherein the annular band comprises a ring portion and a tab; and wherein the tab is configured to block at least a portion of a fluid flow from entering the fluid inlet at predetermined temperatures.

14. The nozzle assembly according to claim 13, wherein the nozzle defines a guide slot extending obliquely in a radial direction and in a circumferential direction of the gas turbine engine; wherein a positioning pin is formed on the annular band and disposed in the guide slot; and wherein the guide slot forces the positioning pin to move obliquely in the radial and circumferential directions as the nozzle expands or contracts relative to the annular band due to a difference between the first and second coefficients of thermal expansion.

15. The nozzle assembly according to claim 14,
wherein the guide slot extends in a direction that forms an angle of between 2 and 8 degrees with a tangent to the circumferential direction.

16. The nozzle assembly according to claim 1, further comprising:
a seal arm disposed between the annular band and the inlet wall and having a first end and a second end;
an actuation pin, wherein the first end of the seal arm is rotatably attached to the inlet wall via the actuation pin; and
a pivot pin, wherein a portion of the seal arm between the first and second ends is pivotably attached to the annular band via the pivot pin, and wherein the second end of the seal arm or a seal disposed on the second end of the seal arm is configured to block at least a portion of a fluid flow from entering the fluid inlet at predetermined temperatures.

17. The nozzle assembly according to claim 16, further comprising:
a biasing structure attached to the second end of the seal arm to bias the second end in a radial direction of the gas turbine engine.

18. The nozzle assembly according to claim 1,
wherein the passive valve assembly is configured to move between a blocking position and an open position, and wherein the passive valve assembly reduces an airflow through the fluid inlet when in the blocking position relative to the open position.

19. A gas turbine engine comprising:
a nozzle assembly comprising:
a nozzle comprising a first material defining a first coefficient of thermal expansion, the nozzle comprising an airfoil defining a fluid passage therein;
an inlet wall defining a fluid inlet that is fluidly connected to the fluid passage; and
a passive valve assembly comprising an annular band, the annular band comprising a second material having a second coefficient of thermal expansion less than the first coefficient of thermal expansion such that the passive valve assembly is at least partially moveable relative to the fluid inlet.

20. The gas turbine engine according to claim 19, further comprising:
a compressor section;
a combustor section downstream of the compressor section; and
a turbine section downstream of the combustor section;
wherein the nozzle is a first stage nozzle of the turbine section; and
wherein the fluid inlet is fluidly coupled to the compressor section via a cooling flowpath that bypasses the combustor section.

* * * * *